(12) United States Patent
Kabiraj et al.

(10) Patent No.: US 11,084,159 B2
(45) Date of Patent: Aug. 10, 2021

(54) LUBRICATION SYSTEM FOR A HYDRAULIC HAMMER

(71) Applicant: Caterpillar Inc., Deerfield, IL (US)

(72) Inventors: Koushik Kabiraj, Ranchi (IN); Cody Moore, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 689 days.

(21) Appl. No.: 16/001,124

(22) Filed: Jun. 6, 2018

(65) Prior Publication Data

US 2019/0375086 A1  Dec. 12, 2019

(51) Int. Cl.
| | |
|---|---|
| B25D 17/26 | (2006.01) |
| F16N 13/18 | (2006.01) |
| F16N 13/10 | (2006.01) |
| E02F 3/96 | (2006.01) |

(52) U.S. Cl.
CPC ............ B25D 17/26 (2013.01); F16N 13/10 (2013.01); F16N 13/18 (2013.01); *B25D 2217/0096* (2013.01); *B25D 2250/121* (2013.01); *E02F 3/966* (2013.01)

(58) Field of Classification Search
CPC ............ B25D 17/26; B25D 2217/0096; B25D 2250/121; B25D 9/12; B25D 9/16; F16N 13/10; F16N 13/16; F16N 13/18; F16N 7/36; F16N 7/38; E02F 3/966
See application file for complete search history.

(56) References Cited

U.S. PATENT DOCUMENTS

| | | | |
|---|---|---|---|
| 2,765,746 A | 10/1956 | Omon | |
| 2,848,014 A | 8/1958 | Tennis | |
| 4,042,311 A | 8/1977 | Yonezawa | |
| 4,233,885 A | 11/1980 | Deschner | |
| 4,576,240 A * | 3/1986 | Matsumoto | B25D 9/12 173/105 |
| 8,087,902 B2 | 1/2012 | Paluncic et al. | |
| 2012/0043163 A1* | 2/2012 | Jagdale | B25D 17/26 184/6.4 |
| 2012/0160528 A1* | 6/2012 | Theobalds | B25D 9/16 173/1 |
| 2013/0240299 A1* | 9/2013 | Jagdale | F16N 7/38 184/6.14 |
| 2016/0046009 A1* | 2/2016 | Moore | F16N 7/36 184/6.14 |

FOREIGN PATENT DOCUMENTS

DE    10162819 B4    10/2005

* cited by examiner

*Primary Examiner* — Michael R Mansen
*Assistant Examiner* — Robert T Reese

(57) ABSTRACT

A lubrication system for a hydraulic hammer includes a body defining a recess in fluid communication with a lubricant inlet and a lubricant outlet. A sleeve, located co-axially within the recess, defines a stepped tubular cavity having first and second portions. The sleeve also defines inlet and outlet ports extending from an outer surface to an inner surface of the sleeve. A piston, located partly within the recess and the first portion of the stepped tubular cavity respectively, has a tubular cavity co-axial with the stepped tubular cavity. A spool is located partly within the tubular cavity and the second portion of the stepped tubular cavity respectively. The spool co-operates with the inlet and outlet ports of the sleeve for reciprocally moving the piston in relation to the body so that lubricant from the lubricant inlet is delivered by the piston to the lubricant outlet via the recess.

20 Claims, 22 Drawing Sheets

LUBRICATION SYSTEM FOR A HYDRAULIC HAMMER

TECHNICAL FIELD

The present disclosure relates to a hydraulic hammer. More particularly, the present disclosure relates to a lubrication system for a hydraulic hammer.

BACKGROUND

Typically, hydraulic hammers that are used in construction and mining have been known to employ lubrication systems that operatively deliver a lubricant into one or more moving components of the hammer. In some cases, a construction of these lubrication systems may be complex, and in other cases, these lubrication systems may be bulky as well. In such cases, the lubrication systems may pose challenges during installation, for example, when tight space constraints are encountered.

In addition, traditionally known lubrication systems for hydraulic hammers would use a worm gear and wheel-driven eccentric shaft that drives a piston for pumping grease. The eccentricity of the wheel-driven shaft determines the piston stroke and the input hydraulic oil drives a motor that would, in turn, drive the wheel-driven shaft. Due to a type and number of components used by the traditionally known lubrication systems, these systems would be prone to component wear, for example, wear associated with teeth of the worm gear.

Hence, there is a need for a lubrication system that is simple, cost-effective and easy to install and operate.

SUMMARY OF THE DISCLOSURE

In an aspect of this disclosure, a lubrication system for a hydraulic hammer includes a body, a sleeve, a piston, and a spool. The body is configured to define a recess that is disposed in fluid communication with a lubricant inlet and a lubricant outlet. The sleeve is located co-axially within the recess. The sleeve has an outer surface, and an inner surface defining a stepped tubular cavity having a first portion and a second portion. The first portion has a diameter greater than a diameter of the second portion. The sleeve also has an inlet port and an outlet port extending from the outer surface to the inner surface adjacent to the second portion of the stepped tubular cavity. The piston is located partly within the recess and the first portion of the stepped tubular cavity of the sleeve respectively such that the piston is in sliding engagement with the inner surface adjacent the first portion of stepped tubular cavity of the sleeve. The piston has a tubular cavity co-axial with the stepped tubular cavity of the sleeve such that a diameter of the tubular cavity of the piston is equal to the diameter of the second portion of the stepped tubular cavity. The spool is located partly within the tubular cavity of the piston and the second portion of the stepped tubular cavity of the sleeve respectively. The spool is bound in movement between an inner end of the piston and a plug located at an end of the sleeve adjacent the second portion of the stepped tubular cavity. The spool is configured to co-operate with the inlet and outlet ports of the sleeve for reciprocally moving the piston in relation to the body so that lubricant from the lubricant inlet is delivered by the piston to the lubricant outlet via the recess.

In another aspect of the present disclosure, a hydraulic hammer includes a housing, a tool, a power cell, a valve body, and a lubrication system. The tool extends outwardly from the housing and is supported by a power cell disposed within the housing. In addition, the hydraulic hammer also includes a valve body that is disposed within the housing and forms part of the power cell. The lubrication system has a body associated with the valve body. The body is configured to define a recess that is disposed in fluid communication with a lubricant inlet and a lubricant outlet. The lubrication system also has a sleeve, a piston, and a spool. The sleeve is located co-axially within the recess of the body. The sleeve has an outer surface, and an inner surface defining a stepped tubular cavity having a first portion and a second portion. The first portion has a diameter greater than a diameter of the second portion. The sleeve also has an inlet port and an outlet port extending from the outer surface to the inner surface adjacent to the second portion of the stepped tubular cavity. The piston is located partly within the recess and the first portion of the stepped tubular cavity of the sleeve respectively such that the piston is in sliding engagement with the inner surface adjacent the first portion of the stepped tubular cavity of the sleeve. The piston has a tubular cavity co-axial with the stepped tubular cavity of the sleeve such that a diameter of the tubular cavity of the piston is equal to the diameter of the second portion of the stepped tubular cavity. The spool is located partly within the tubular cavity of the piston and the second portion of the stepped tubular cavity of the sleeve respectively. The spool is bound in movement between an inner end of the piston and a plug located at an end of the sleeve adjacent the second portion of the stepped tubular cavity. The spool is configured to co-operate with the inlet and outlet ports of the sleeve for reciprocally moving the piston in relation to the body so that lubricant from the lubricant inlet is delivered by the piston to the lubricant outlet via the recess.

Other features and aspects of this disclosure will be apparent from the following description and the accompanying drawings.

DETAILED DESCRIPTION

Wherever possible, the same reference numbers will be used throughout the drawings to refer to same or like parts.

Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

The present disclosure relates to a hydraulic hammer 100. More particularly, the present disclosure relates to a lubrication system 110 for a hydraulic hammer 100.

Figure 1:
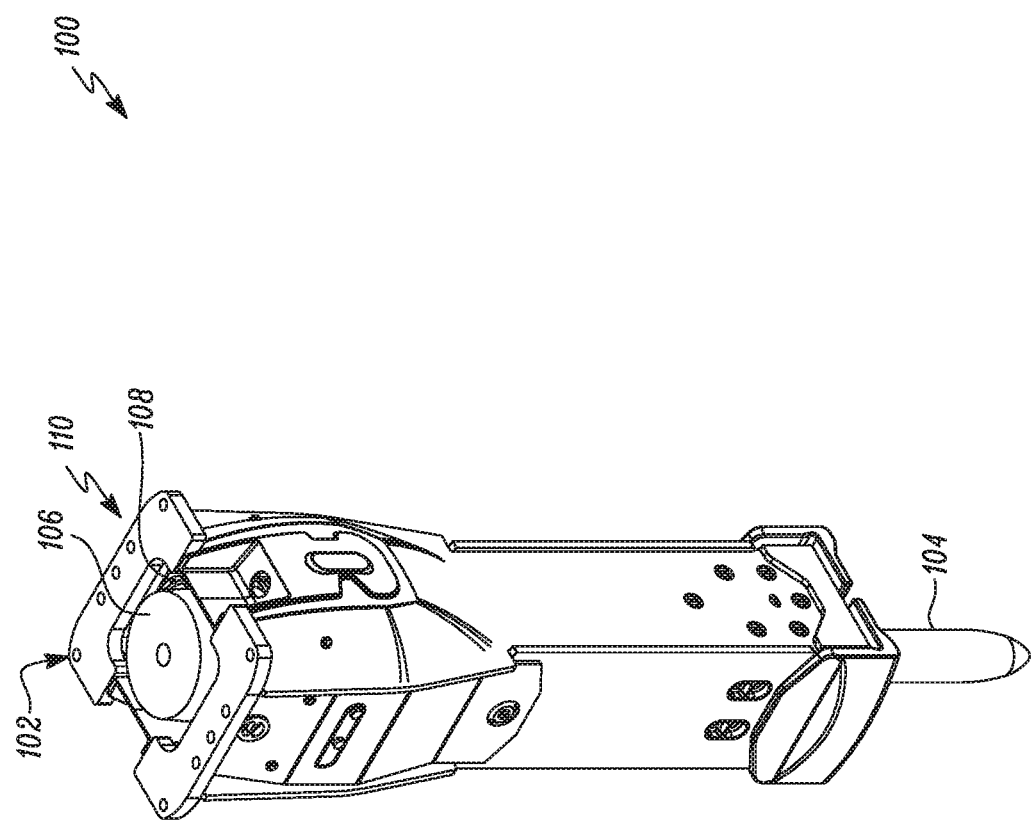
FIG. 1 is a front perspective view of a hydraulic hammer, in accordance with an embodiment of the present disclosure.

FIG. 1 depicts a hydraulic hammer 100 that can be used on work sites to break up or demolish large hard objects such as, but not limited to, rocks, concrete, asphalt, or frozen ground before such objects can be moved from one location to another in smaller transportable pieces. The hydraulic hammer 100 disclosed herein can be mounted to work machines such as, back hoes or excavators. For sake of simplicity, the hydraulic hammer 100 will hereinafter be referred to as 'the hammer 100' and denoted by identical numeral '100'.

As shown, the hammer 100 has a housing 102, and a tool 104 that is configured to extend outwardly from the housing 102. This tool 104 is supported by a power cell 106 that is disposed within the housing 102. The hammer 100 also has a valve body 108 that is disposed within the housing 102 and forms part of the power cell 106. In operation, high pressure fluid could actuate the power cell 106 via the valve body 108 so that the hammer 100 strikes the tool 104, such as a bit shown in FIG. 1, that would in turn strike against the hard object to be broken.

Figure 2:
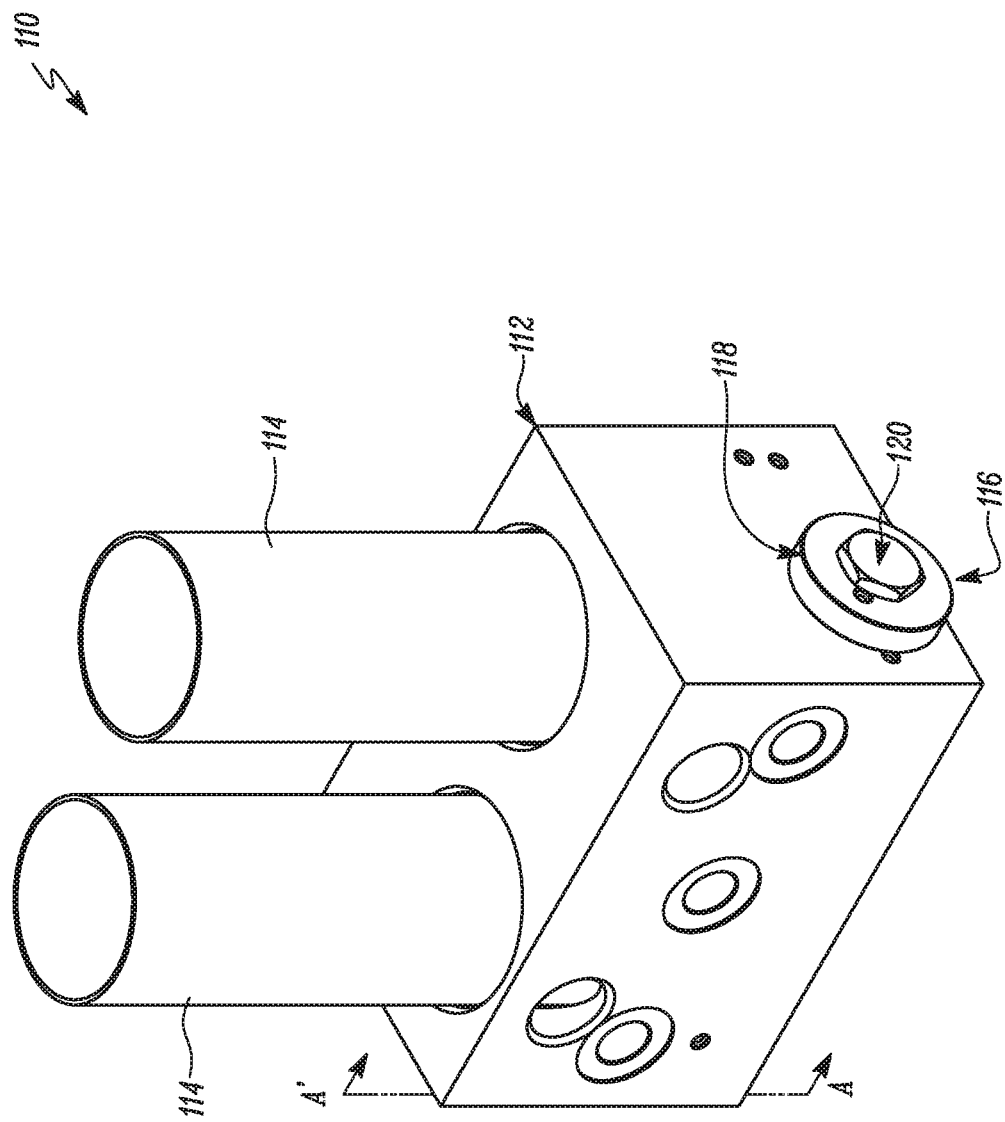
FIG. 2 is a side perspective view of a lubrication system that could be employed by the hydraulic hammer of FIG. 1, in accordance with an embodiment of the present disclosure.
Figure 3:
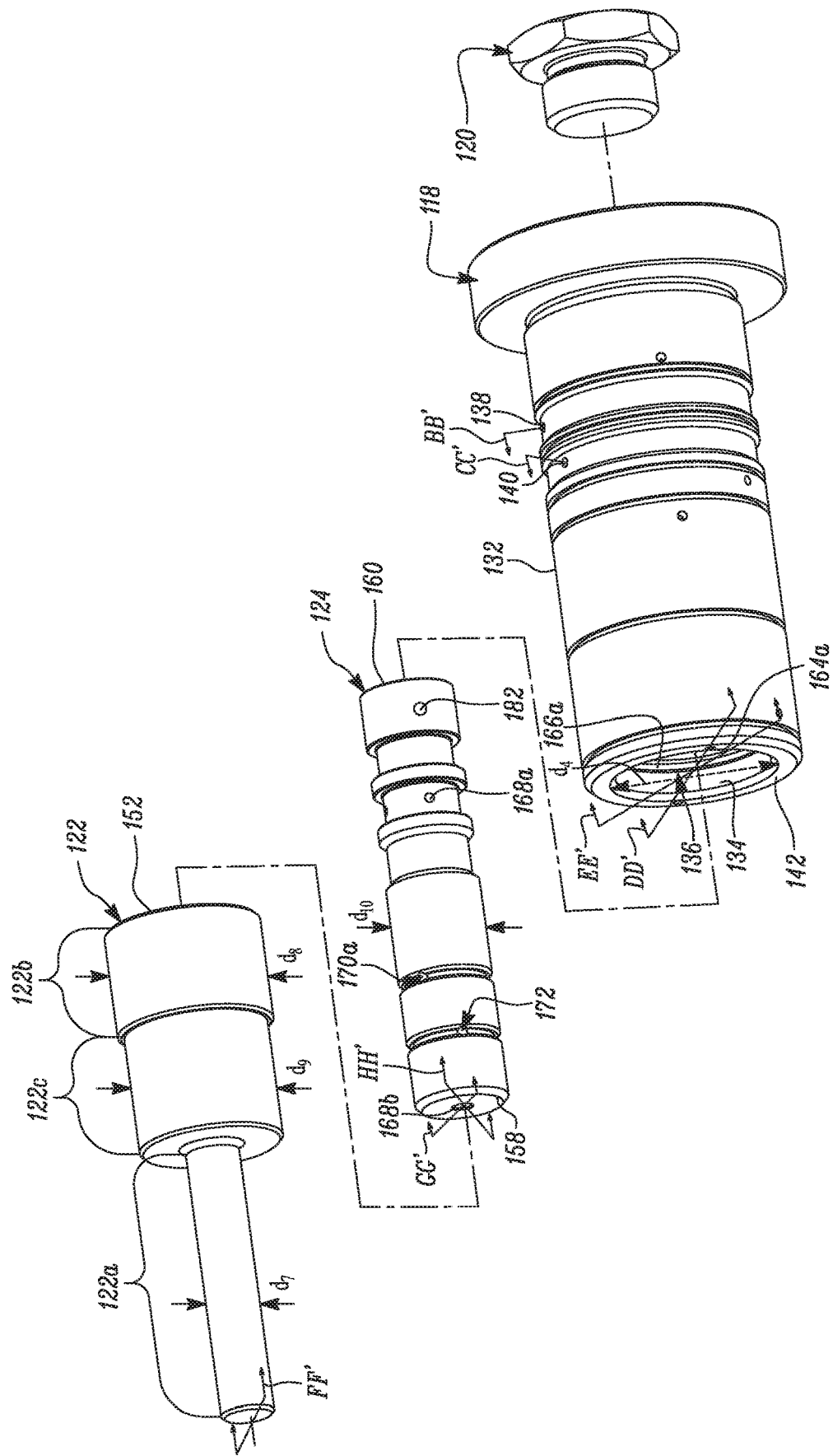
FIG. 3 is a partially exploded view of the lubrication system showing a sleeve, a plug, a piston, and a spool, in accordance with an embodiment of the present disclosure.

The hammer 100 disclosed herein would also have a lubrication system 110 that would be associated with the valve body 108. As shown in the view of FIG. 2, this lubrication system 110 has a body 112 to which a pair of cartridges 114 containing lubricant, e.g., grease may be mounted, for example, by screwing each cartridge 114 onto a corresponding threaded receptacle 113 (refer to FIGS. 4 and 8) defined on the body 112. The lubrication system 110 also includes a pump 116 associated with the body 112. The pump 116 is formed using a sleeve 118, a plug 120, a piston 122, and a spool 124, as shown in FIG. 3, together with the body 112 as shown in FIG. 2 and which will be explained hereinafter in conjunction with FIGS. 2 through 10F, and more particularly, with FIGS. 2 through 8 while a working of the lubrication system 110 will be explained in conjunction with FIGS. 9A through 9D and FIGS. 10A through 10F.

Figure 4:
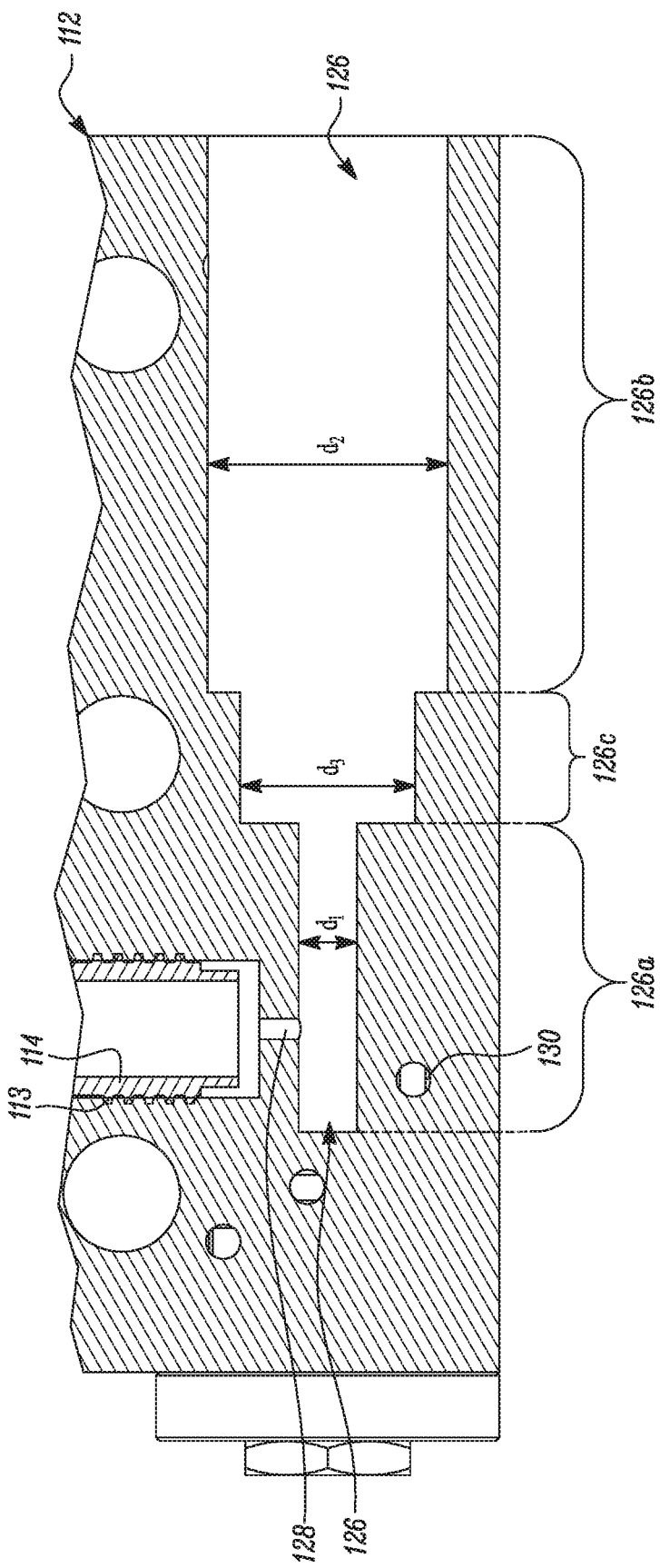
FIG. 4 is a sectional view of a body of the lubrication system taken along section plane AA' of FIG. 2.

As shown best in FIG. 4, the body 112 is configured to define a recess 126 that is disposed in fluid communication with a lubricant inlet 128 and a lubricant outlet 130. In the illustrated embodiment of FIG. 4, the recess 126 has a first portion 126a proximal to the lubricant inlet and outlet 128, 130, a second portion 126b distal from the first portion 126a, and a mid-portion 126c that is located between the first and second portions 126a, 126b. Moreover, as shown, a diameter $d_3$ of the mid-portion 126c is greater than a diameter $d_1$ of the first portion 126a and less than a diameter $d_2$ of the second portion 126b.

In operation, lubricant from the mounted cartridge 114 would be dispensed into the first portion 126a of the recess 126 via the lubricant inlet 128, and the pump 116 of the lubrication system 110 (best shown in FIG. 8) would operatively displace the piston 122 to reciprocally move within the recess 126 such that the piston 122 delivers the lubricant from the lubricant inlet 128 to the lubricant outlet 130 via the first portion 126a of the recess 126.

Figure 8:
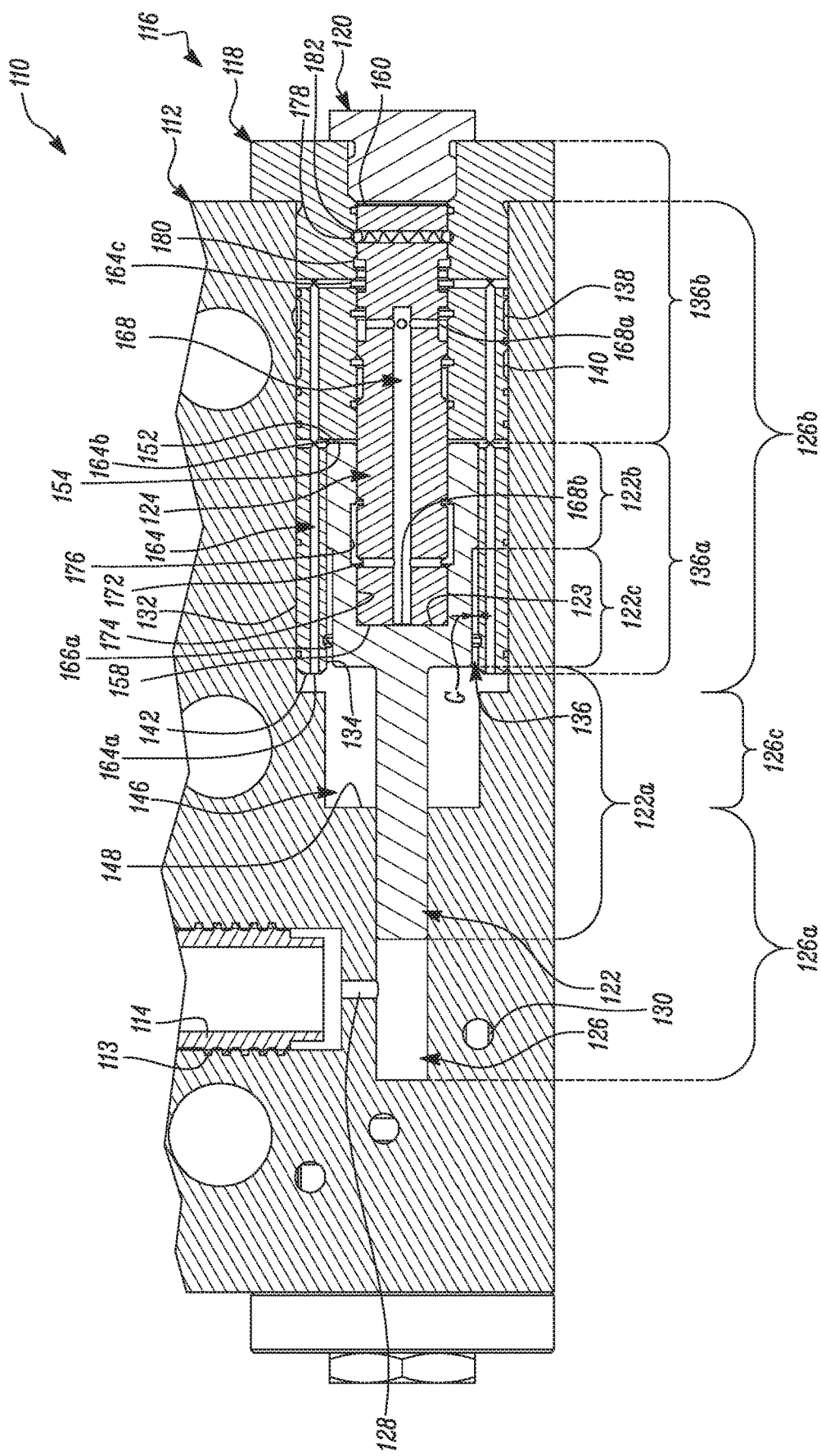
FIG. 8 is a sectional view of the lubrication system taken along section plane AA' of FIG. 2.

As best shown in FIG. 8, the sleeve 118 would be located co-axially within the recess 126 of the body 112. Referring now to FIGS. 3 and 8, and as best shown in FIGS. 5A-5D, the sleeve 118 would have an outer surface 132, and an inner surface 134 defining a stepped tubular cavity 136 having a first portion 136a and a second portion 136b. The first portion 136a has a diameter $d_4$ greater than a diameter $d_5$ of the second portion 136b.

Figure 5A:
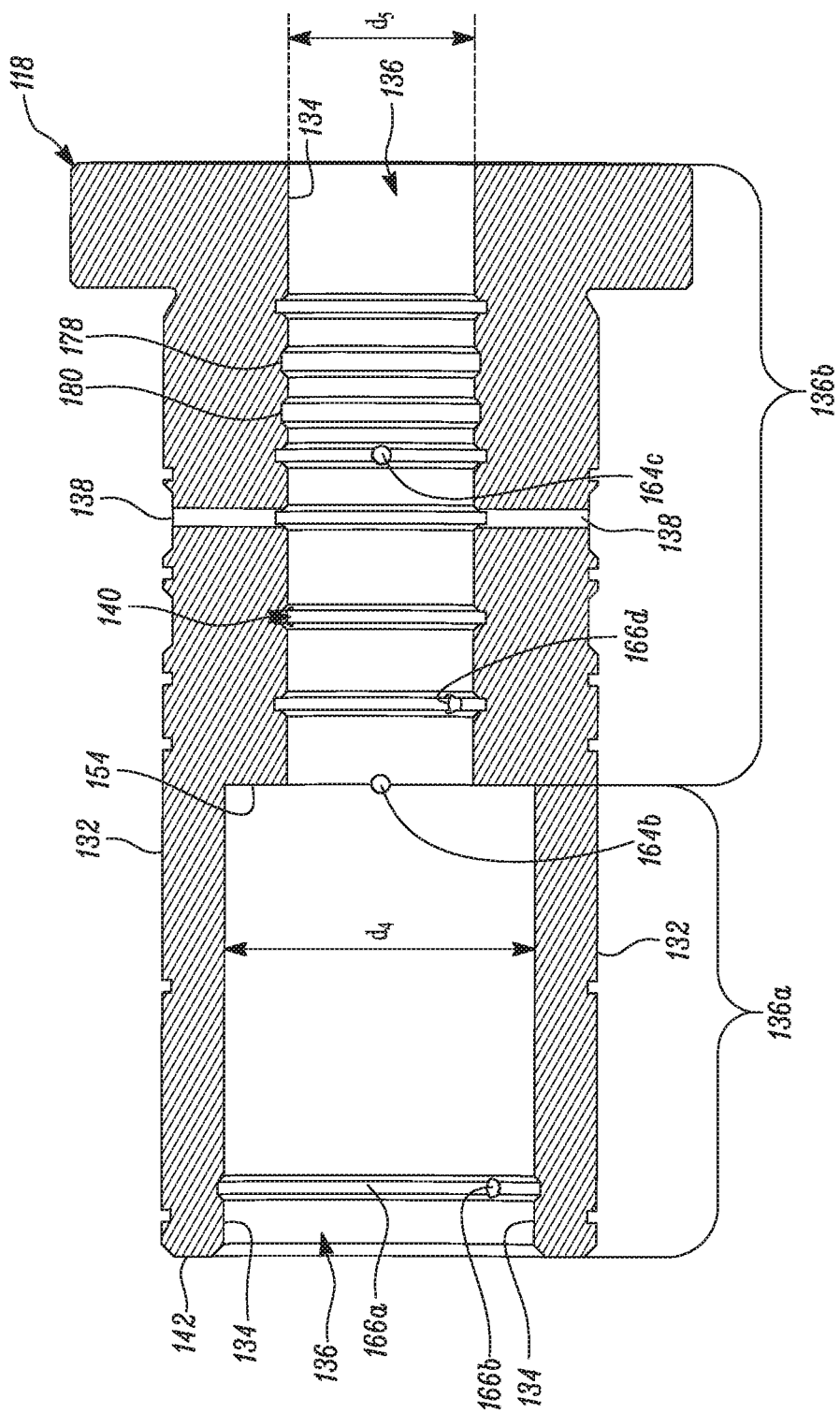
FIGS. 5A-5D are sectional views taken along section planes BB', CC', DD', and EE' of the sleeve from FIG. 3 respectively.
Figure 5B:
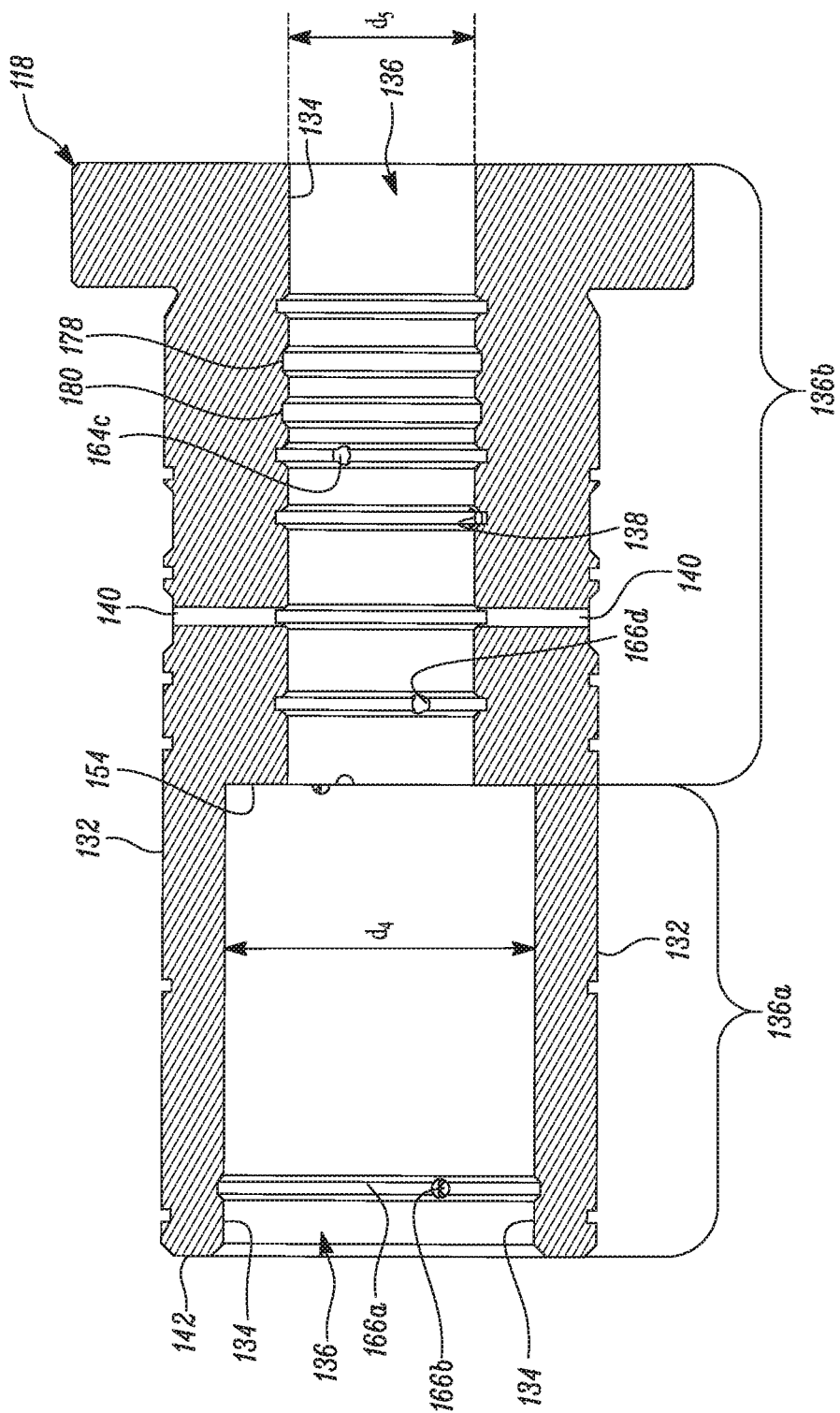

The sleeve 118 would also have an inlet port 138 as best shown in FIG. 5A, and an outlet port 140 as best shown in FIG. 5B. The inlet and outlet ports 138, 140 disclosed herein would extend from the outer surface 132 to the inner surface 134 adjacent to the second portion 136b of the stepped tubular cavity 136.

Referring to FIG. 8 and as best shown in FIGS. 9A through 10E, a piston left chamber 146 is operatively defined between the mid-portion 122c of the piston 122, an end 148 of the mid-portion 126c of the recess 126 and the inner surface 134 of the sleeve 118 adjacent the first portion 136a of the stepped tubular cavity 136 of the sleeve 118. As shown best in FIGS. 9B through 10E, a piston right chamber 150 would be operatively defined between an end 152 of the second portion 122b of the piston 122 and an intermediary end 154 of the sleeve 118 that is located between, and adjacent to, the first and second portions 136a, 136b of the stepped tubular cavity 136. Also, as shown best in FIGS. 9B through 10C, a spool left chamber 156 would be operatively defined between a left end 158 of the spool 124 and the inner end 123 of the piston 122. Further, as shown in FIGS. 10B through 10E, a spool right chamber 162 would be operatively defined between a right end 160 of the spool 124 and the plug 120.

Figure 5C:
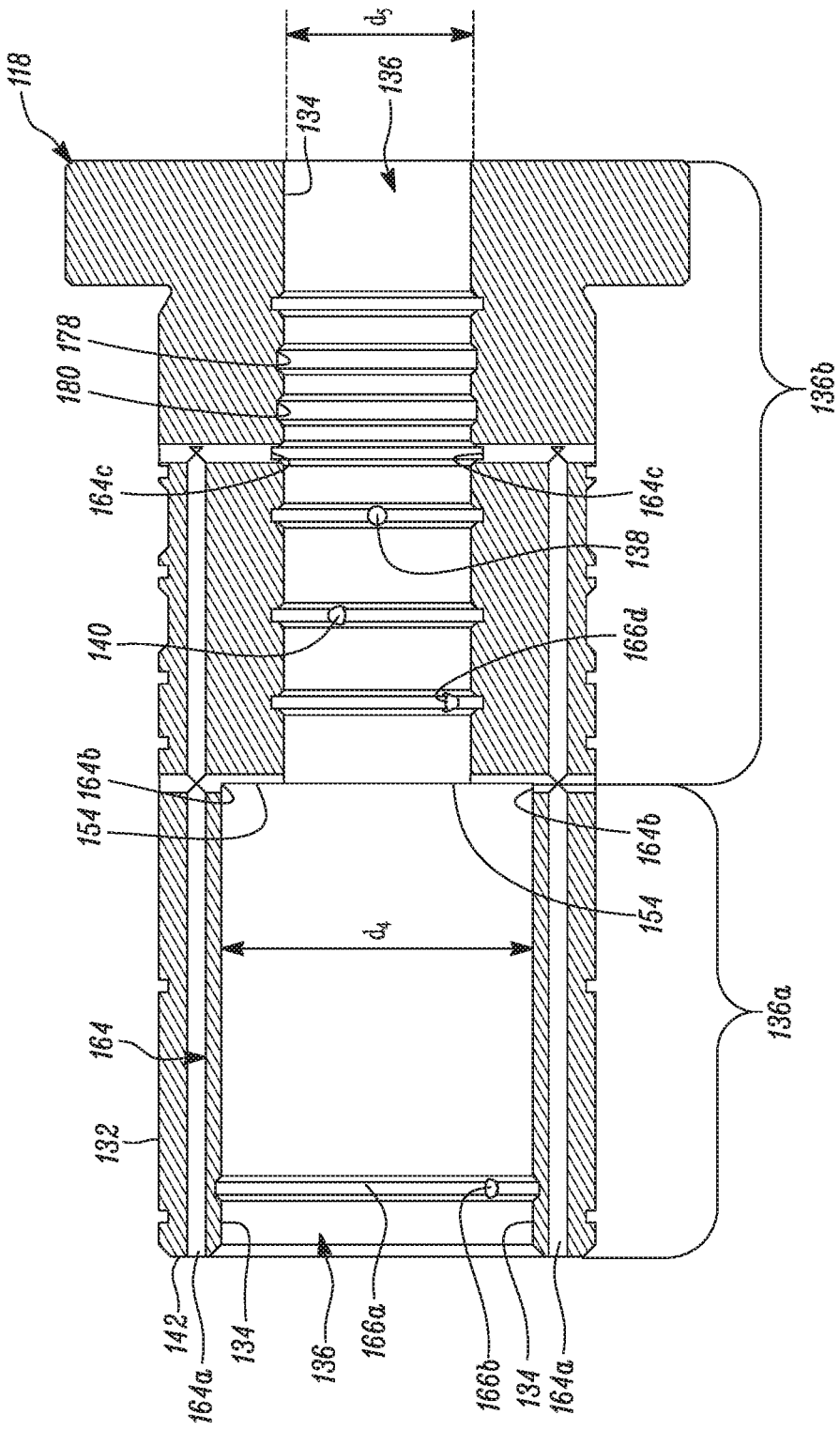

As best shown in FIG. 5C, the sleeve 118 is configured to define a first fluid crossover pathway 164 having a first port 164a, a second port 164b, and a third port 164c. The first port 164a would be located at an end 142 of the sleeve 118 and would be disposed in fluid communication with a piston left chamber 146 as shown in FIGS. 8, 9A-9D, and 10A-10F. Referring to FIG. 5C, the second port 164b would be located at the intermediary end 154 of the sleeve 118 and be operatively disposed in fluid communication with the piston right chamber 150 as shown in FIGS. 9B-10E. Again, referring to FIG. 5C and as best shown in FIGS. 10B-10E, the third port 164c would be disposed in selective fluid communication with the inlet port 138 of the sleeve 118 based on a position of the spool 124 relative to the sleeve 118.

Figure 5D:
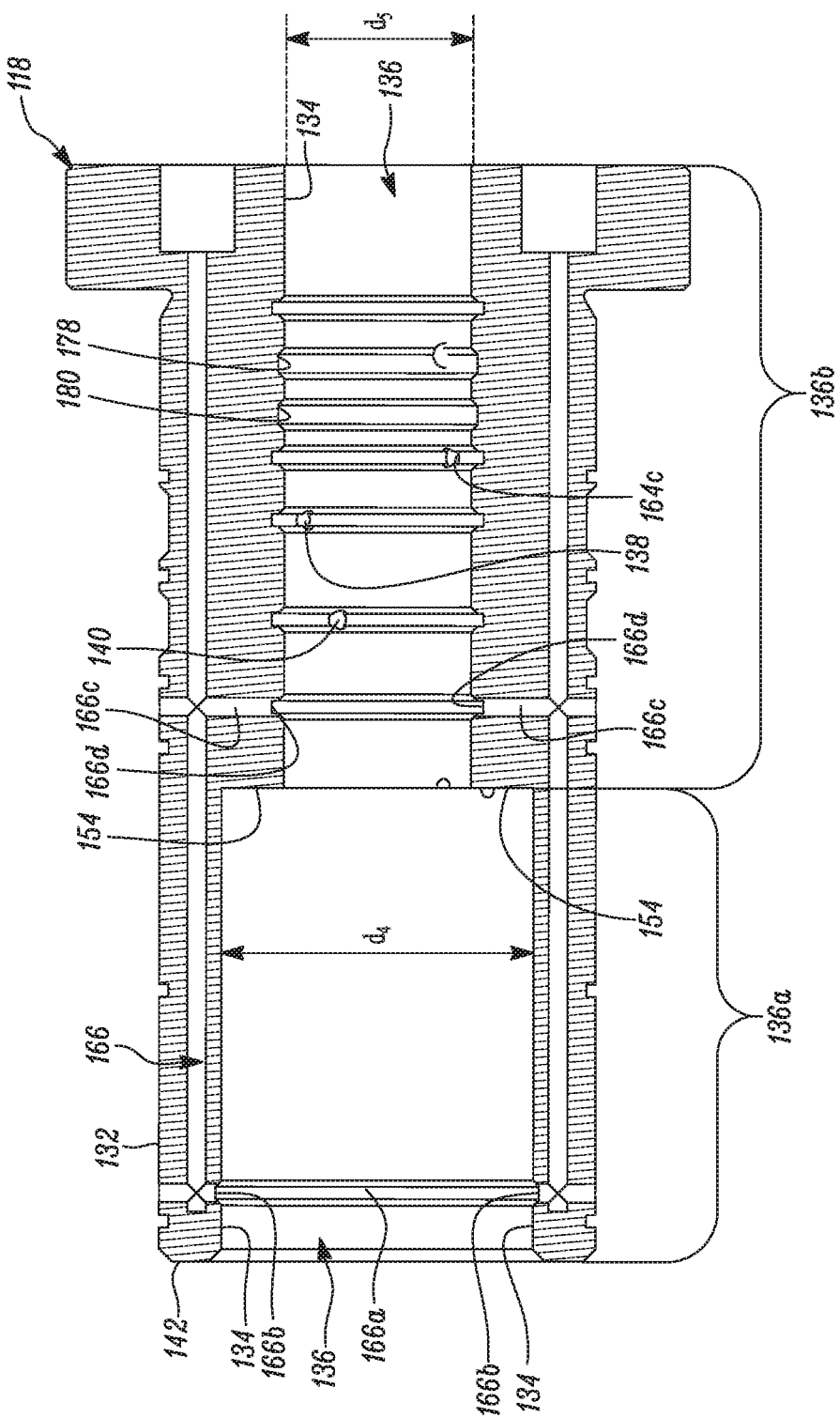

Referring to FIG. 5D, the sleeve 118 is configured to define a second fluid crossover pathway 166 having a first annular groove 166a, a fourth port 166b, and a first return conduit 166c. The first annular groove 166a would be defined on the inner surface 134 adjacent the first portion 136a of the stepped tubular cavity 136 of the sleeve 118. The fourth port 166b would be disposed in fluid communication with the first annular groove 166a and would be configured to extend from the first annular groove 166a towards the intermediary end 154 of the sleeve 118 for defining the first return conduit 166c that, in turn, would extend towards the inner surface 134 of the sleeve 118 adjacent the second portion 136b of the stepped tubular cavity 136 of the sleeve 118. The first return conduit 166c would also terminate in a fifth port 166d that, as shown in FIGS. 9B and 9C, would be disposed in selective fluid communication with the outlet port 140 of the sleeve 118 based on a position of the spool 124 relative to the sleeve 118.

Figure 6:
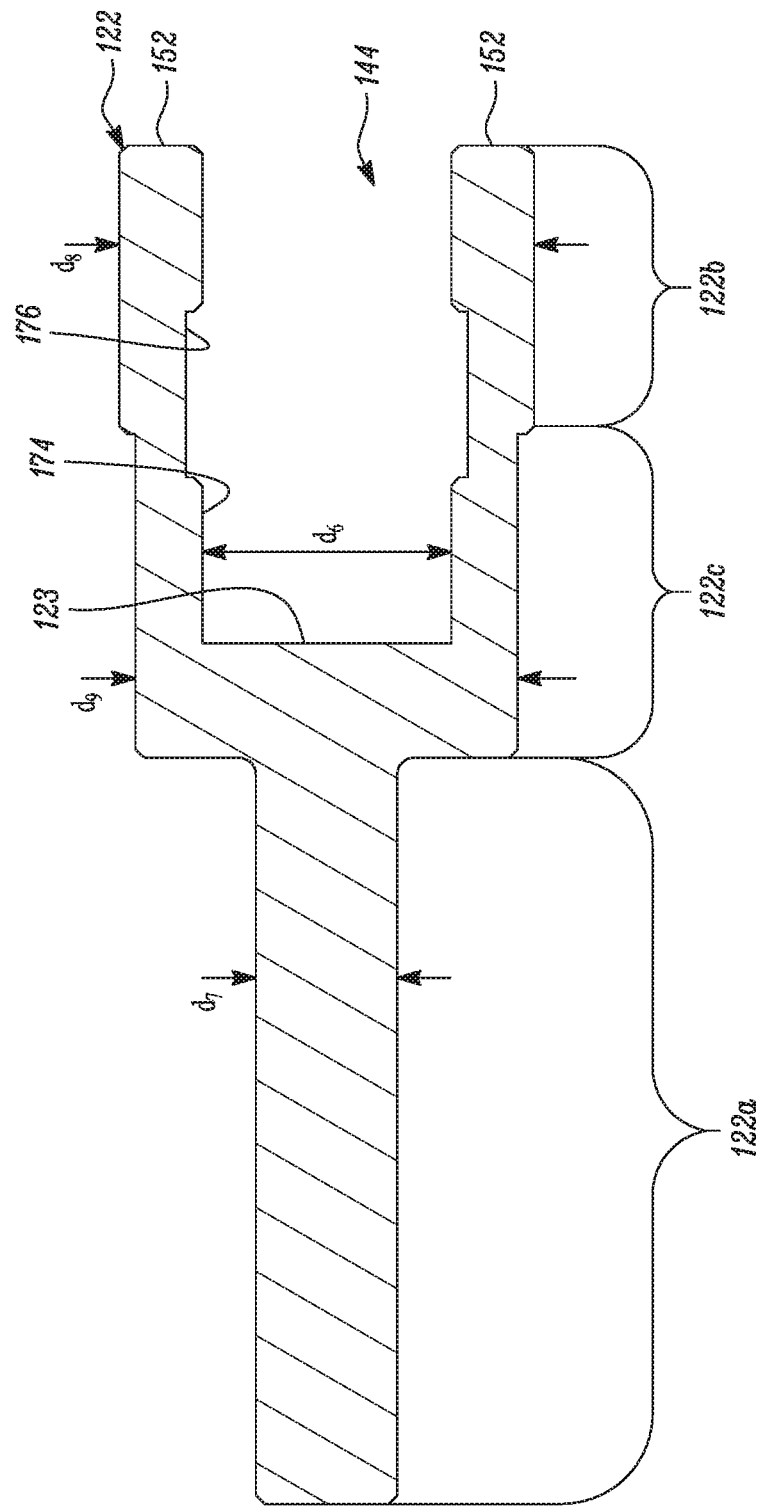
FIG. 6 is a sectional view taken along section plane FF' of the piston from FIG. 3.

As shown best in FIGS. 3 and 6, the piston 122 has a first portion 122a, a second portion 122b distal from the first portion 122a, and a mid-portion 122c located between the first and second portions 122a, 122b. An outer diameter $d_9$ of the mid-portion 122c is greater than an outer diameter $d_7$ of the first portion 122a and less than an outer diameter $d_5$ of the second portion 122b. As best shown in FIG. 8, the first portion 122a of the piston 122 is disposed in sliding engagement with the first portion 126a of the recess 126. The second portion 122b of the piston 122 is disposed in sliding engagement with the inner surface 134 of the sleeve 118 adjacent the first portion 136a of the stepped tubular cavity 136. Therefore, stated differently, as shown in FIG. 8, the piston 122 would be located partly within the recess 126 and the first portion 136a of the stepped tubular cavity 136 of the sleeve 118 respectively such that the piston 122 is in sliding engagement with the inner surface 134 adjacent the first portion 136a of the stepped tubular cavity 136 of the sleeve 118. Moreover, as best shown in FIG. 8, the outer diameter $d_9$ of the mid-portion 122c of the piston 122 is less than the diameter $d_4$ of the first portion 136a of the stepped tubular cavity 136 of the sleeve 118 to define a gap G therebetween. Further, referring to FIG. 6 and as best shown in FIG. 8, the piston 122 also has a tubular cavity 144 that is co-axial with the stepped tubular cavity 136 of the sleeve 118 and a diameter $d_6$ of the tubular cavity 144 of the piston 122 would be equal to the diameter $d_5$ of the second portion 136b of the stepped tubular cavity 136 i.e., $d_6=d_5$.

Referring to FIG. 3 and as best shown in FIG. 8, the spool 124 would be located partly within the tubular cavity 144 of the piston 122 and the second portion 136b of the stepped tubular cavity 136 of the sleeve 118 respectively. A maximum outer diameter $d_{10}$ of the spool 124 would be selected such that the maximum outer diameter $d_{10}$ of the spool 124 lies within a pre-determined range of values from the diameter $d_5$ of the second portion 136b of the stepped tubular cavity 136 of the sleeve 118 and the diameter $d_6$ of the tubular cavity 144 of the piston 122 by taking into account the requisite fitting tolerances needed for establishing a sliding engagement of the spool 124 with the sleeve 118 and the piston 122. Also, as shown in FIG. 8, the spool 124 would be bound in movement between an inner end 123 of the piston 122 and the plug 120 that is located at an end 142 of the sleeve 118 adjacent the second portion 136b of the stepped tubular cavity 136. In operation, the spool 124 would co-operate with the inlet and outlet ports 138, 140 of the sleeve 118 for reciprocally moving the piston 122 in relation to the body 112 so that lubricant from the lubricant inlet 128 is delivered by the piston 122 to the lubricant outlet 130 via the recess 126.

Figure 7A:
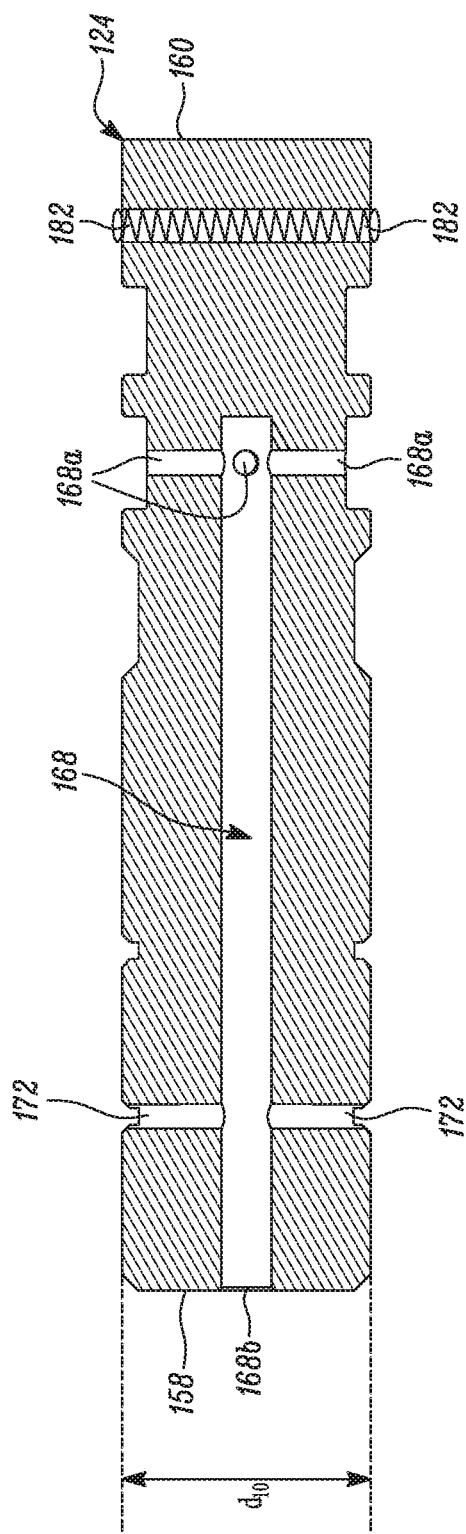
FIGS. 7A and 7B are sectional views taken along section planes GG' and HH' of the spool from FIG. 3 respectively.

As shown in FIG. 7A, the spool 124 would also be configured to define a supply conduit 168 having an inlet port 168a located at a first point partway along a length of the spool 124. As shown best in FIGS. 9A through 9D, this inlet port 168a would be disposed in selective fluid communication with the inlet port 138 of the sleeve 118 based on a position of the spool 124 relative to the sleeve 118. Further, referring again to FIG. 7A, the supply conduit 168 would be configured to extend from the inlet port 168a towards the left end 158 of the spool 124 to define an outlet port 168b. This outlet port 168b would operatively be disposed in fluid communication with the spool left chamber 156 as shown in FIGS. 9B through 10C.

Figure 7B:
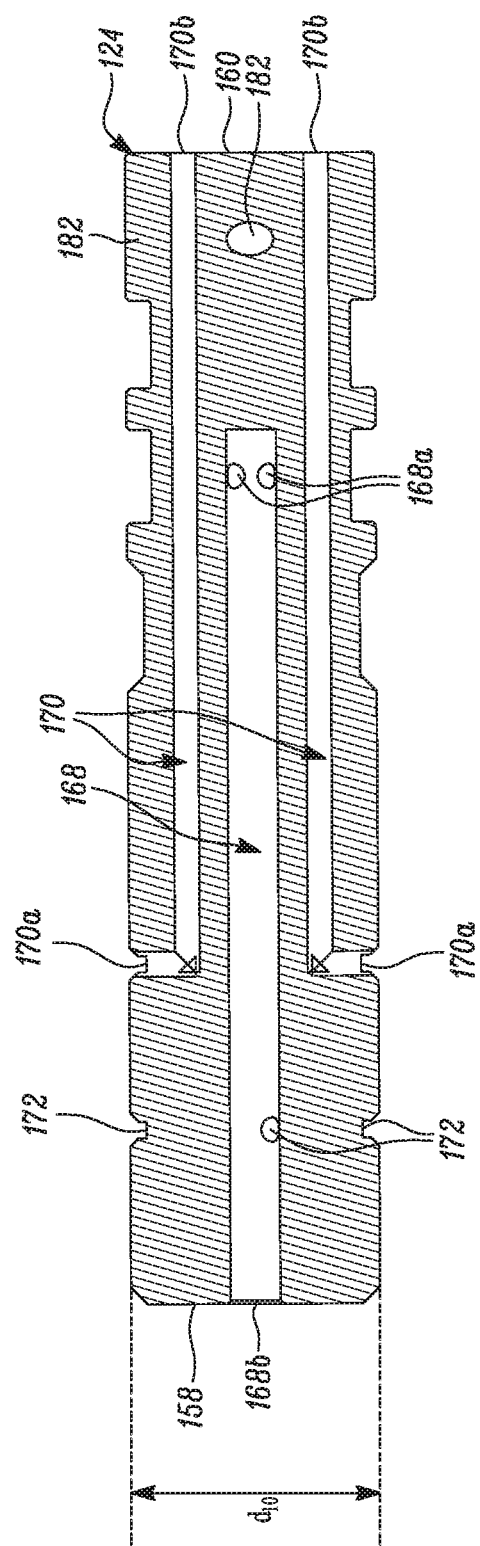

As shown in FIG. 7B, the spool 124 would also be configured to define a switch conduit 170 having a first switch port 170a. The first switch port 170a would be located at a second point partway along the length of the spool 124. The switch conduit 170 would also extend from the first switch port 170a towards the right end 160 of the spool 124 so as to define a second switch port 170b that, as shown in FIGS. 10B through 10E, could be operatively disposed in fluid communication with the spool right chamber 162.

Referring again to FIG. 7B, the spool 124 would also be configured to define a second return conduit. The second return conduit would be configured to selectively communicate fluid from the switch conduit 170 to the outlet port 140 of the sleeve 118 via the supply conduit 168 based on a positioning of the spool 124 relative to a second annular groove 176 defined on an inner surface 174 of the mid-portion 122c of the piston 122 shown in FIGS. 10E and 10F.

In an embodiment shown in FIG. 8 and best shown in FIGS. 5A-5D, the inner surface 134 of the sleeve 118, located between the third port 164c of the sleeve 118 and the plug 120, would also be configured to define a first locking groove 178 and a second locking groove 180 respectively. The second locking groove 180 would be disposed in a spaced apart manner from the first locking groove 178. Also, in this embodiment, the spool 124 would, as shown in FIG. 7A, include a spring-biased detent mechanism 182. This spring-biased detent mechanism 182 would be configured to co-operate independently with each of the first and second locking grooves 178, 180 to offer a pre-determined amount of bias against movement of the spool 124 relative to the sleeve 118 and the piston 122.

A manner of working of the lubrication system 110 will now be described in conjunction with FIGS. 9A-9D, and FIGS. 10A-10F respectively. As such, FIGS. 9A-9D are sectional views of the lubrication system 110 from FIG. 8 showing the lubrication system 110 in different stages of a first mode of operation, while FIGS. 10A-10F are sectional views of the lubrication system 110 from FIG. 8 showing the lubrication system 110 in different stages of a second mode of operation.

Figure 9A:
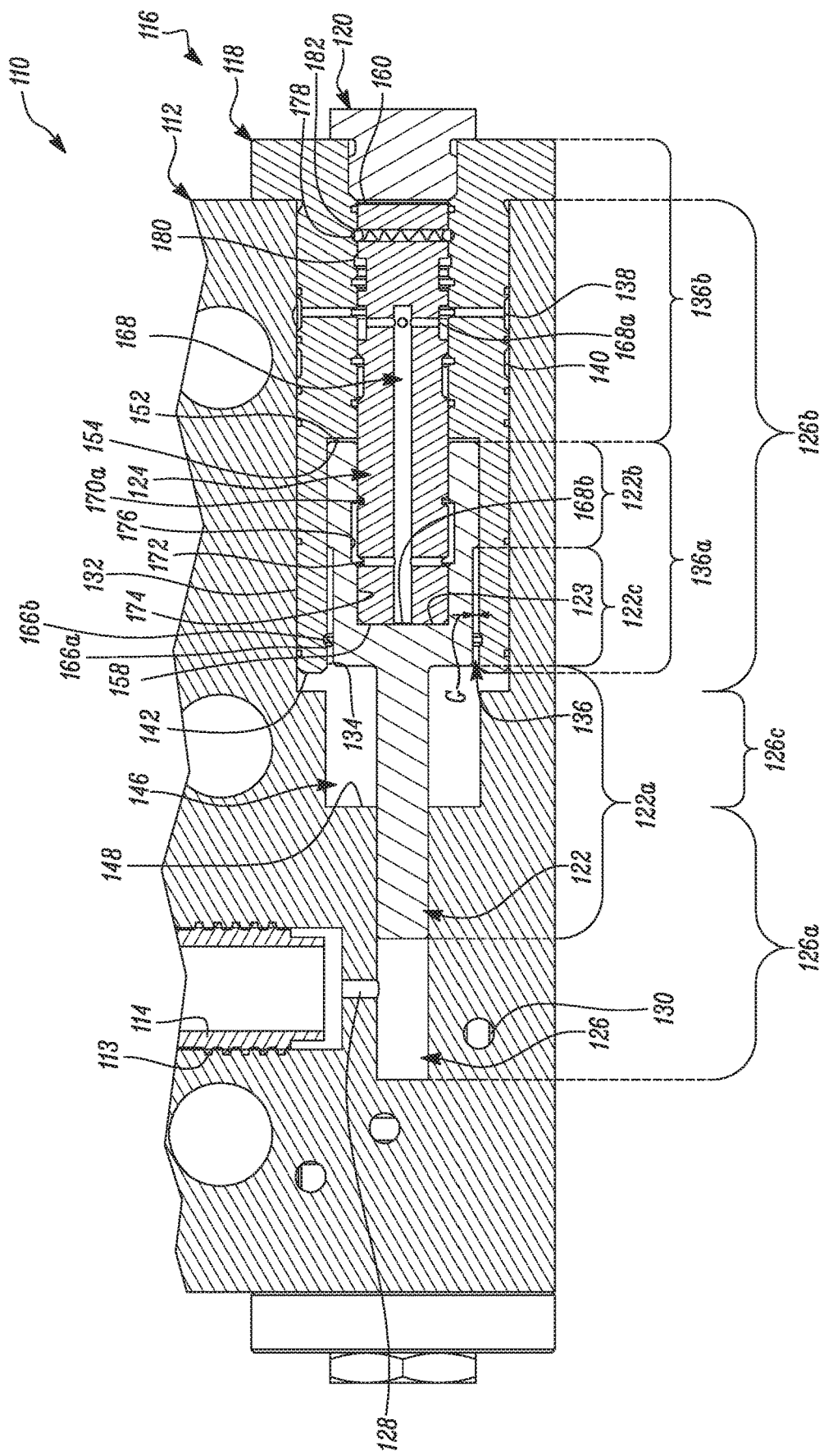
FIGS. 9A-9D are sectional views of the lubrication system from FIG. 8 showing different stages in a first mode of operation.
Figure 9B:
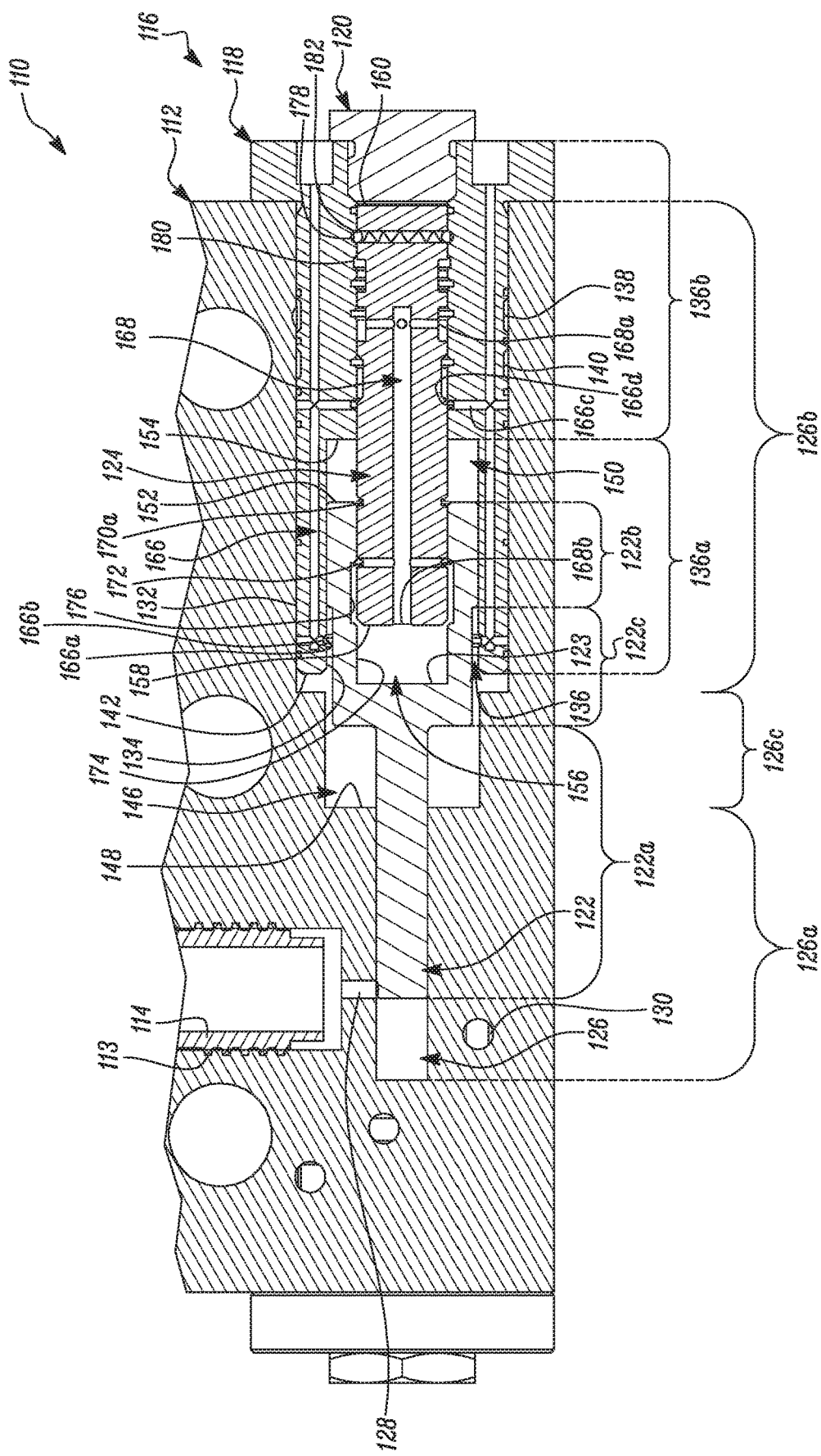
Figure 9C:
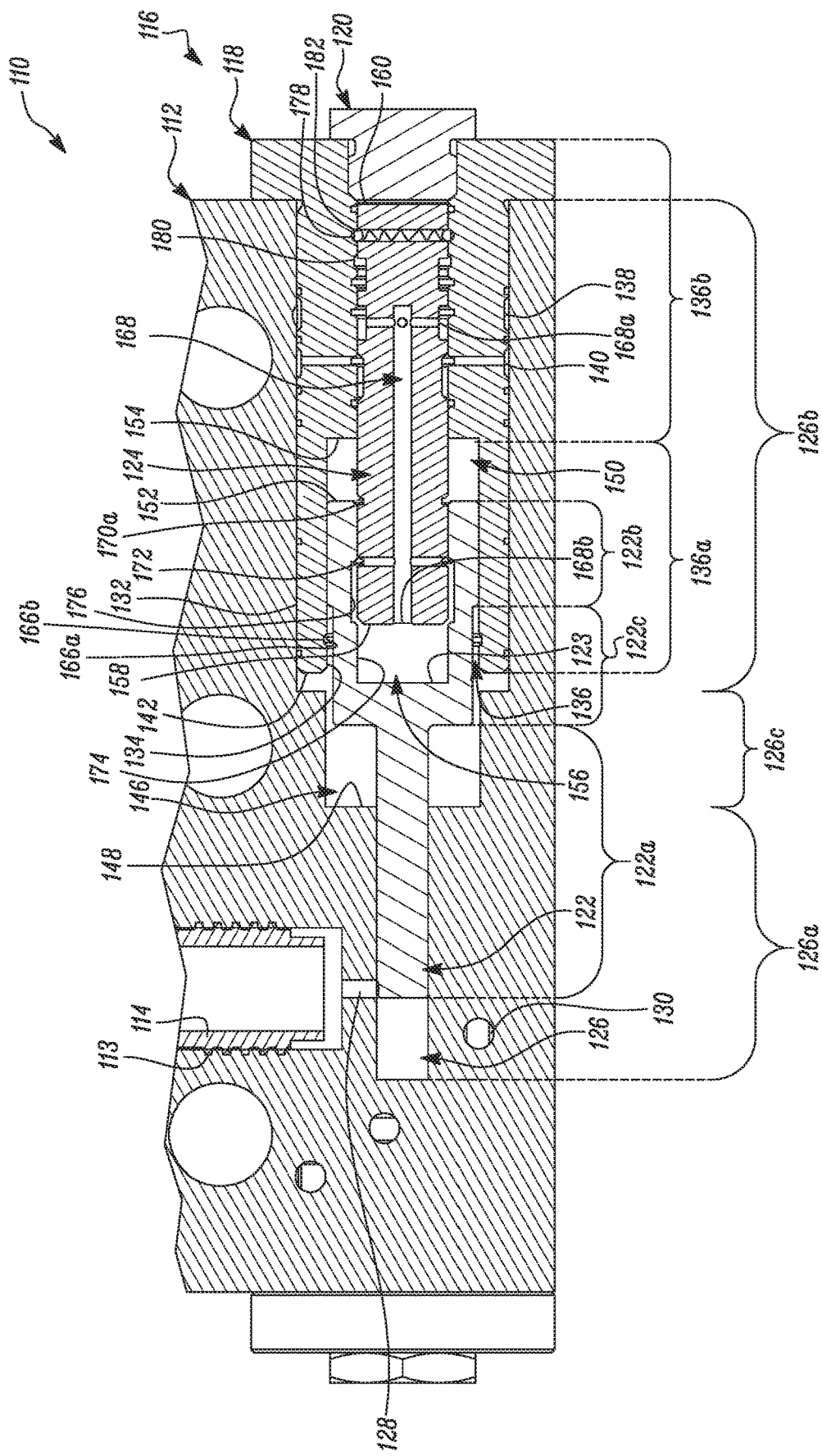

In FIG. 9A, the first mode of operation is commenced. The first mode of operation can be regarded as being inclusive of the movement of the piston 122 relative to the recess 126 such the first portion 122a of the piston 122 moves towards the lubricant inlet 128. In the view of FIG. 9A, the spool 124 is held by the spring-biased detent mechanism 182 at the first locking position defined in the sleeve 118. An actuating fluid, for example, oil of a pre-determined grade would be supplied via the inlet port 138 of the sleeve 118. This actuating fluid would be communicated into the supply conduit 168 of the spool 124 via the inlet port 168a associated with the supply conduit 168 of the spool 124. The actuating fluid would then be communicated to the outlet port 168b of the spool 124 where the actuating fluid tends to bias the inner end 123 of the piston 122 away from the left end 158 of the spool 124. This causes the piston 122 to move away from the spool 124 and a concomitant expansion of the spool left chamber 156 and the piston right chamber 150 occurs that which is shown in the view of FIG. 9B.

Concurrently, with the movement of the piston 122 away from the spool 124 as depicted in FIG. 9B, actuating fluid present in the piston left chamber 146 would be urged to flow through the gap G and enter the first annular groove 166a. This fluid from the first annular groove 166a would be communicated via the fourth port 166b and the first return conduit 166c to the fifth port 166d. With the spool 124 being disposed in the position depicted in FIG. 9B, the fifth port 166d is in fluid communication with the outlet port 140 of the sleeve 118. Therefore, referring to the views of FIGS. 9A, 9B and 9C, actuating fluid would be supplied via the inlet port 138 of the sleeve 118 while part of the fluid from the piston left chamber 146 would be allowed to egress the pump 116 via the outlet port 140 of the sleeve 118.

Figure 9D:
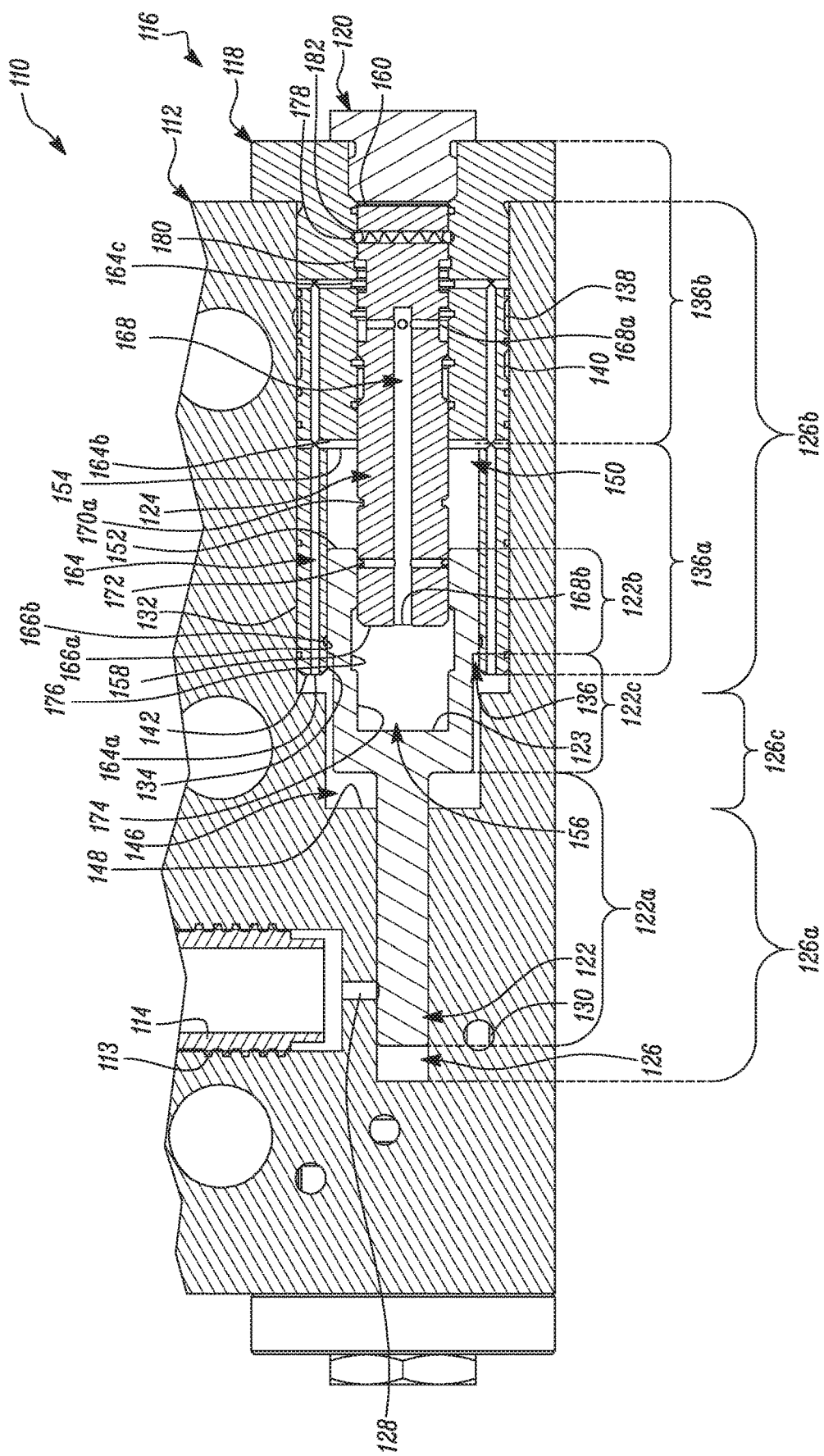

Referring to FIG. 9D, as the supply of actuating fluid from the inlet ports 138, 168*a* is continued into the spool left chamber 156, the increasing amount of actuating fluid in the spool left chamber 156 further biases and hence, displaces the piston 122 within the recess 126 to move further away from the left end 158 of the spool 124. This would cause the second portion 122*b* of the piston 122 to travel past the first switch port 170*a* until the first switch port 170*a* opens and the second portion 122*b* of the piston 122 occludes the first annular groove 166*a* and the fourth port 166*b*. Due to the occlusion of the first annular groove 166*a* and the fourth port 166*b* by the second portion 122*b* of the piston 122, fluid from the piston left chamber 146 is now caused, under the effect of positive bias from movement of the piston 122 away from the spool 124 by the fluid in the spool left chamber 156, to flow into the first fluid crossover pathway 164. Therefore, a portion of the fluid remnant in the piston left chamber 146 enters the first port 164*a* of the first fluid crossover pathway 164 and is communicated to the piston right chamber 150 via the second port 164*b* of the first fluid crossover pathway 164.

Figure 10A:
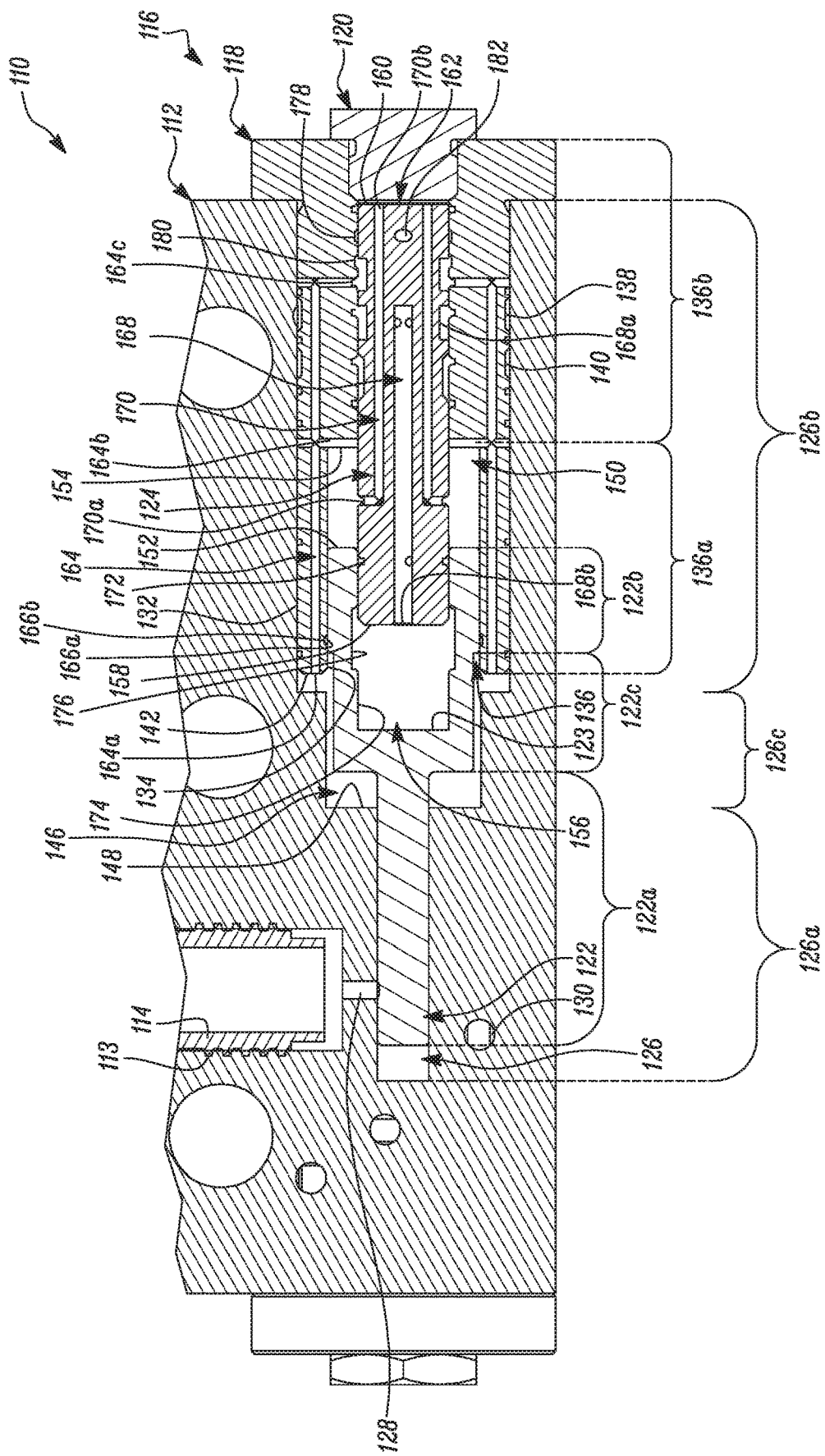
FIGS. 10A-10F are sectional views of the lubrication system from FIG. 8 showing different stages in a second mode of operation.
Figure 10B:
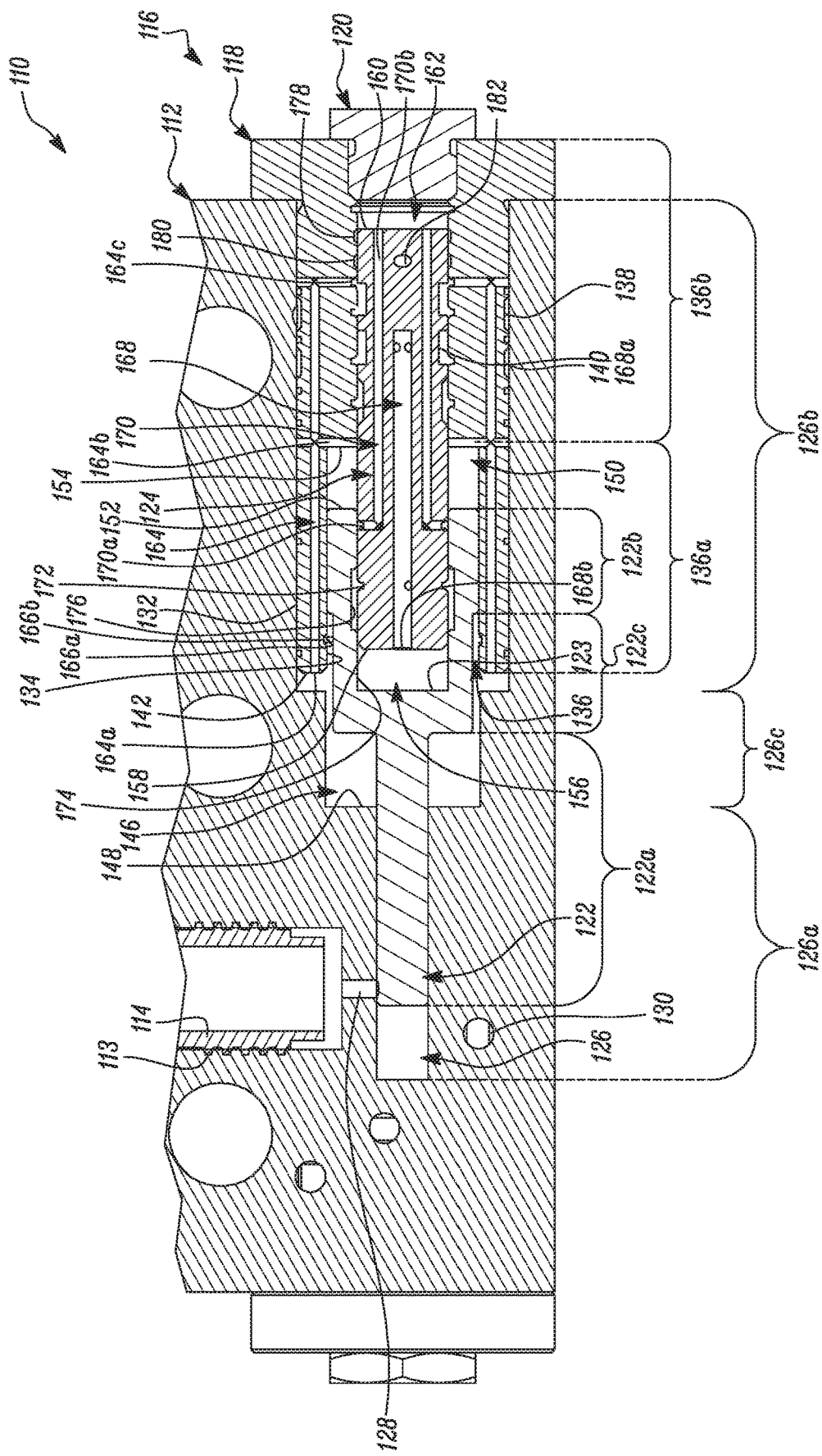
Figure 10C:
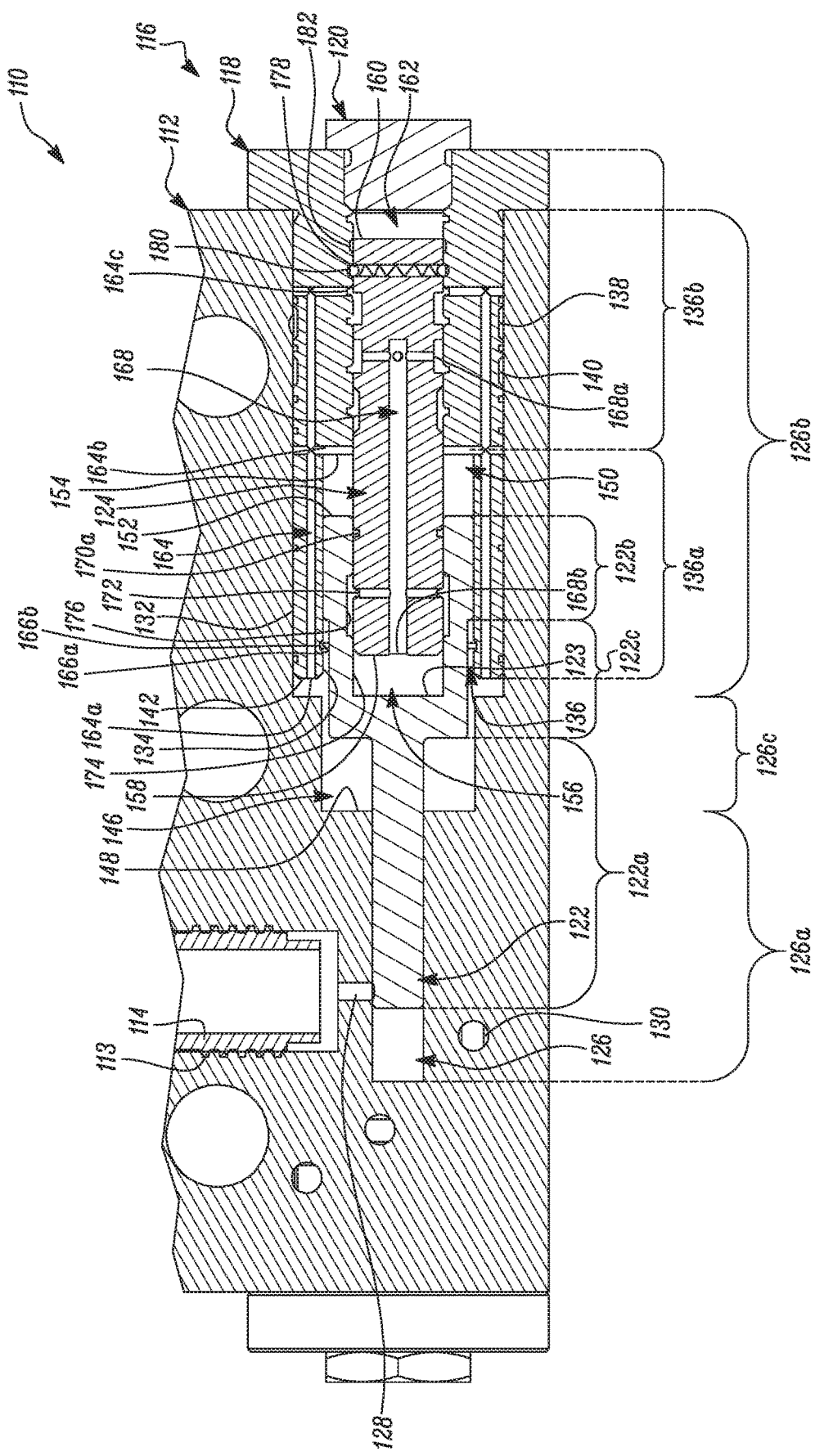

Now referring to FIG. 10A, fluid from the piston right chamber 150 would be communicated to the switch conduit 170 via the first switch port 170*a*. Fluid entering the first switch port 170*a* moves towards the second switch port 170*b* of the switch conduit 170 to enter the spool right chamber 162. Referring now to FIGS. 10A and 10B, fluid entering the spool right chamber 162 would cause movement of the spool 124 towards the inner end 123 of the piston 122 by overcoming the pre-determined amount of bias co-operatively offered by the detent mechanism 182 together with the first locking groove 178 against movement of the spool 124 relative to the sleeve 118 and the piston 122. As shown in FIG. 10B, the detent mechanism 182 is now positioned within the second locking groove 180 as compared to being positioned within the first locking groove 178 shown in the view of FIG. 10A.

Upon movement of the spool 124 towards the inner end 123 of the piston 122 until the detent mechanism 182 is in position with the second locking groove 180, the spool 124 would become positioned such that the inlet port 138 of the sleeve 118 would now be in fluid communication with the piston's left and right chambers 146, 150 via the third port 164*c* of the first fluid crossover pathway 164. Moreover, the spool left chamber 156 would also be in communication with the outlet port 140 of the sleeve 118 via the outlet and inlet ports 168*b*, 168*a* associated with the supply conduit 168 of the spool 124. Therefore, fluid from the inlet port 138 of the sleeve 118 could now be communicated into the piston's left and right chambers 146, 150 via the third port 164*c* of the first fluid crossover pathway 164 while fluid from the spool left chamber 156 would egress via the outlet and inlet ports 168*b*, 168*a* associated with the supply conduit 168 of the spool 124 and thereafter, the outlet port 140 of the sleeve 118.

Movement of actuating fluid from the inlet port 138 of the sleeve 118 into the piston's left and right chambers 146, 150 i.e., via the third port 164*c*, and subsequently, via the first and second ports 164*a*, 164*b* of the first fluid crossover pathway 164 could tend to bias the piston 122 in both directions i.e., towards the end 148 of the mid-portion 126*c* of the recess 126 and also towards the left end 158 of the spool 124 but, it is hereby contemplated that in embodiments herein, the piston 122 would be configured such that an area differential would exist between the mid-portion 122*c* of the piston 122 and the end 152 of the second portion 122*b* of the piston 122 where the surface area of the piston 122 adjacent the mid-portion 126*c* of the recess 126 would be larger than an area associated with the end 152 of the second portion 122*b* of the piston 122. Due to this area differential, although the pressure of fluid in the piston's left and right chambers 146, 150 are the same i.e., equal to a pressure of fluid at the inlet port 138 of the sleeve 118, an amount of force exerted on the mid-portion 122*c* of the piston 122 would be greater than an amount of force exerted on the end 152 of the second portion 122*b* of the piston 122. This would cause movement of the piston 122 towards the left end 158 of the spool 124 under a positive bias from fluid entering the piston left chamber 146 as opposed to the fluid entering the piston right chamber 150.

Figure 10D:
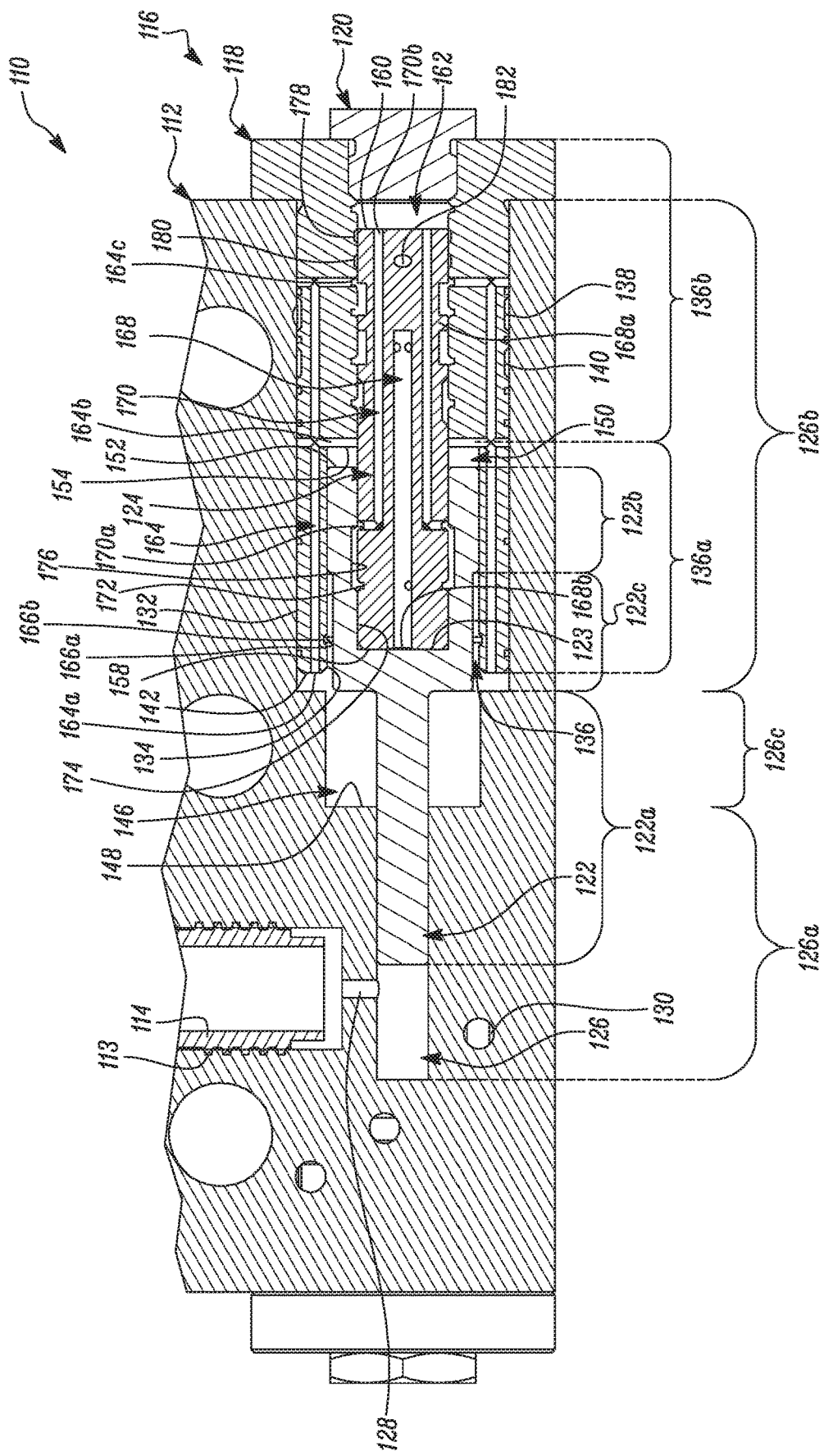
Figure 10E:
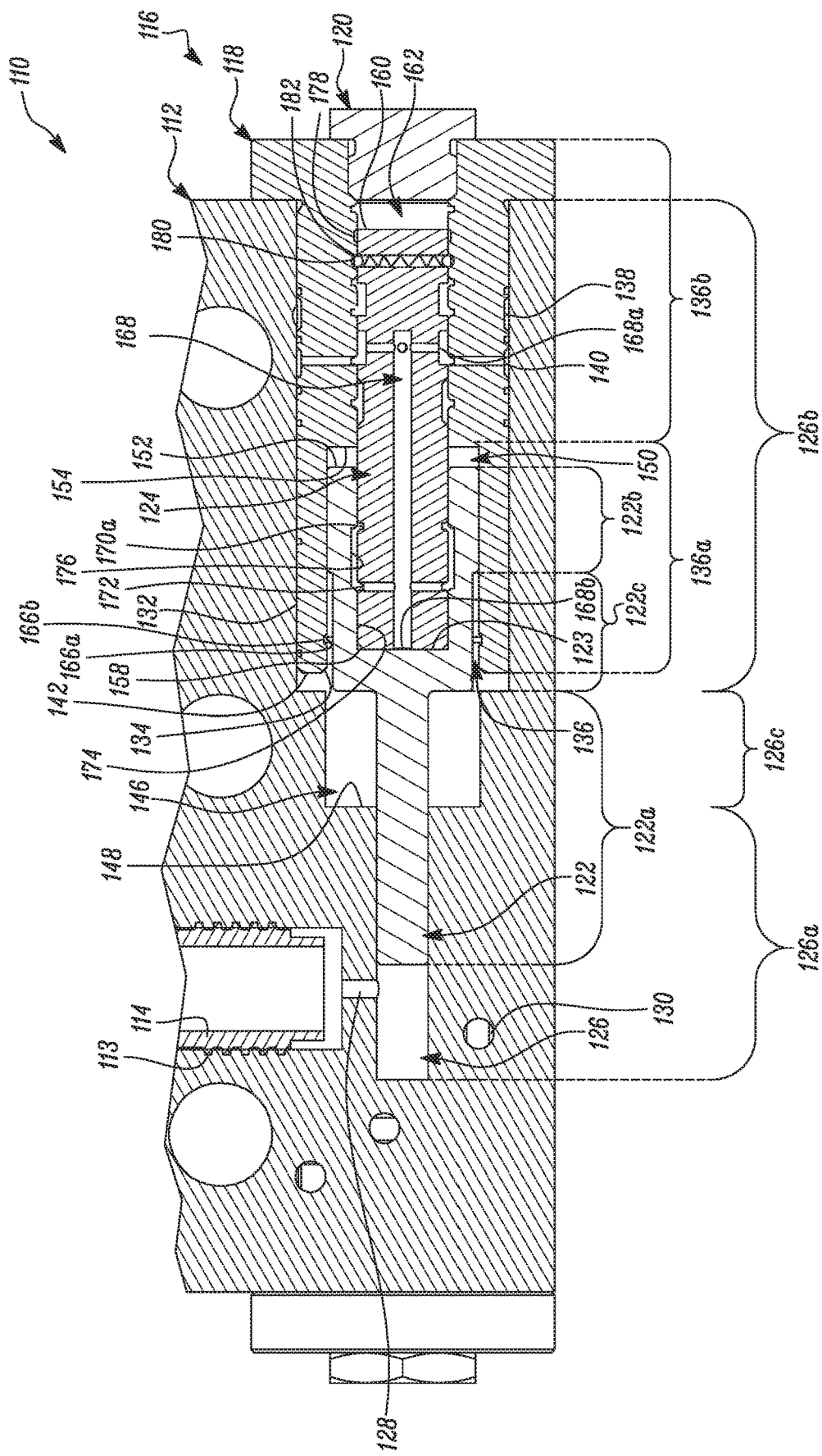

As shown in FIG. 10D, the piston 122 is shown displaced in a position where the second annular groove 176 defined on the inner surface 174 of the piston 122 facilitates fluid communication between the first switch port 170*a* and the second return conduit 172 of the spool 124. Also, as shown, the supply conduit 168 of the spool 124 is in fluid communication with the outlet port 140 of the sleeve 118 after the fluid from the spool left chamber 156 has been urged to egress the outlet port 140 of the sleeve 118 via the supply conduit 168 of the spool 124. At this stage of operation, as the inner end 123 of the piston 122 has moved towards the left end 158 of the spool 124, the second annular groove 176 comes into position for providing a pathway for fluid communication between the first switch port 170*a* and the second return conduit 172 of the spool 124. Fluid from the spool right chamber 162 would now be able to flow into the second return conduit 172 of the spool 124 via the switch conduit 170 and the second annular groove 176 therebetween as shown in the view of FIG. 10E. The fluid entering the second return conduit 172 would, therefore, egress the outlet port 140 of the sleeve 118 causing a loss of pressure in the spool right chamber 162.

Figure 10F:
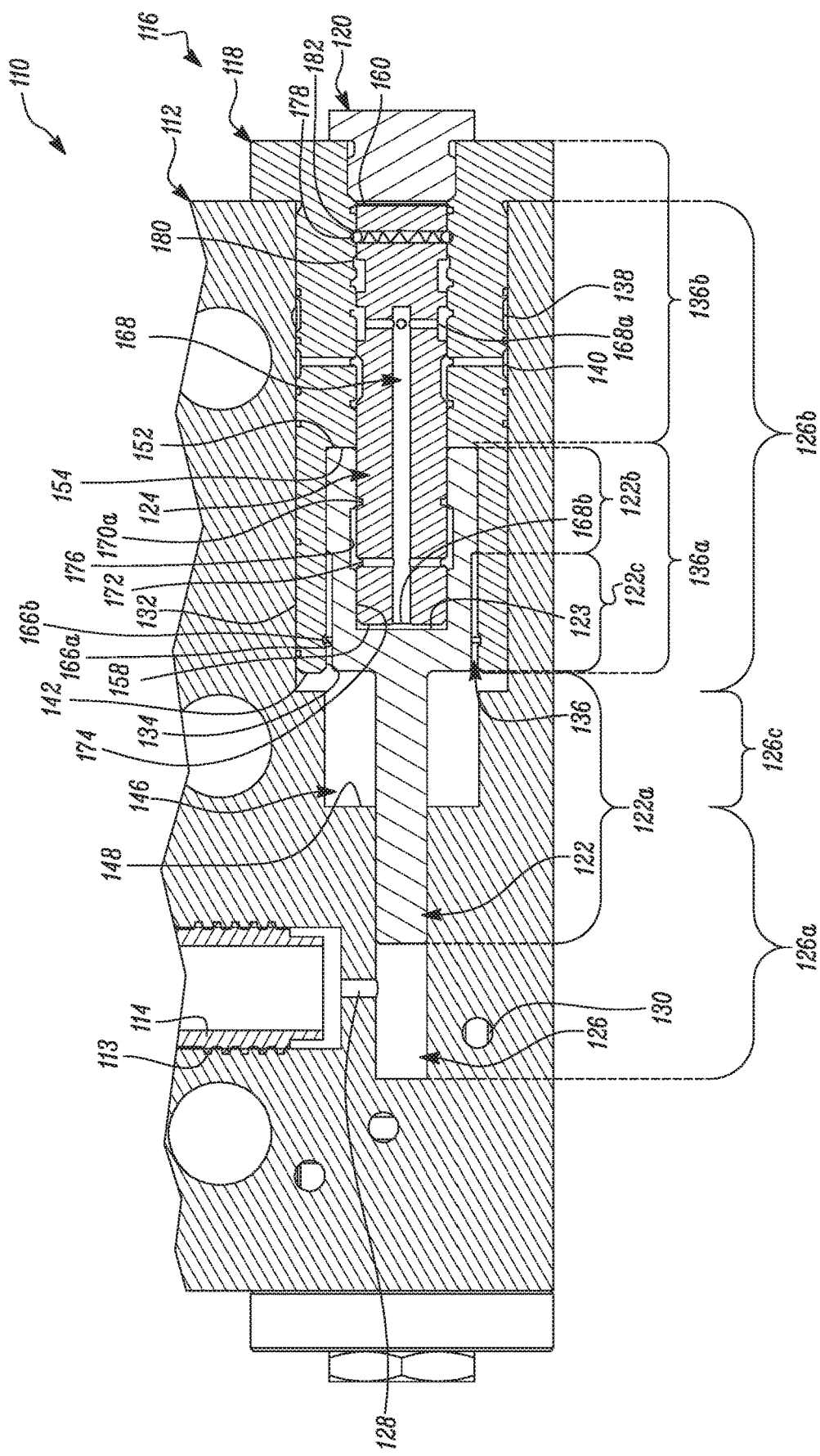

At this stage of operation, the piston 122 would also be urged to move further away from the end 148 of the mid-portion 126*c* of the recess 126 by the fluid entering the piston left chamber 146. Consequently, the inner end 123 of the piston 122 would abut with the left end 158 of the spool 124. With loss of pressure in the spool right chamber 162, and the inner end 123 of the piston 122 abutting the left end 158 of the spool 124, the piston 122 would now push the spool 124 to overcome the pre-determined amount of biasing force offered co-operatively by the detent mechanism 182 together with the second locking groove 180 against movement of the spool 124 relative to the sleeve 118. When the biasing force offered by the detent mechanism 182 together with the second locking groove 180 is overcome, the spool 124 moves simultaneously, or in tandem, with the piston 122 towards the plug 120. As shown in FIG. 10F, the spool 124 is shown positioned such that the right end 160 of the spool 124 is proximal to the plug 120 and the detent mechanism 182 returns to co-operate with the first locking groove 178 as opposed to the second locking groove 180 shown in the view of FIG. 10E. After the detent mechanism 182 has returned to co-operate with the first locking groove 178, the cycle of operation could be repeated with the sequence of movements depicted in the views of FIGS. 9A through 9D, and thereafter 10A through 10F.

Various embodiments disclosed herein are to be taken in the illustrative and explanatory sense and should in no way be construed as limiting of the present disclosure. All joinder references (e.g., mounted, associated, connected and the like) are only used to aid the reader's understanding of the present disclosure, and may not create limitations, particularly as to the position, orientation, or use of the components disclosed herein. Therefore, joinder references, if any, are to be construed broadly. Moreover, such joinder references do not necessarily infer that two elements are directly connected to each other.

Additionally, all positional terms, such as, but not limited to, "left", "right", "first", "second" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element relative to, or over, another element.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional components, such features may be omitted from the scope of the present disclosure without departing from the spirit of the present disclosure as defined in the appended claims.

INDUSTRIAL APPLICABILITY

Embodiments of the present disclosure have applicability for use in delivering a lubricant from a lubricant inlet 128 to a lubricant outlet 130 for lubricating one or more components present in a hydraulic hammer 100. With use of the present disclosure, manufacturers can produce axially displaceable pump 116 mechanisms to render a compact configuration of the lubrication system 110 required by the hydraulic hammer 100.

As traditionally known lubricating systems were known to be bulky in design and complex in operational characteristics owing to one or more limitations in system design, the lubrication system 110 of the present disclosure is less bulky and simple in design as compared to traditionally known lubricating systems. Moreover, by rendering the lubrication system 110 with a compact configuration, the lubrication system 110 can be accommodated within the housing 102 of the hydraulic hammer 100. Further, it is hereby also envisioned that, due to a reduction in the number of parts that would be required to form the lubrication system 110 disclosed herein, the lubrication system 110 of the present disclosure would be cost-effective, and easy to operate and maintain.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A lubrication system for a hydraulic hammer, the lubrication system comprising:
   a body defining a recess in fluid communication with a lubricant inlet and a lubricant outlet;
   a sleeve located co-axially within the recess, the sleeve having:
   an outer surface and an inner surface defining a stepped tubular cavity having a first portion and a second portion, wherein the first portion has a diameter greater than a diameter of the second portion, and
   an inlet port and an outlet port extending from the outer surface to the inner surface adjacent to the second portion of the stepped tubular cavity;
   a piston located partly within the recess and the first portion of the stepped tubular cavity of the sleeve respectively such that the piston is in sliding engagement with the inner surface adjacent the first portion of stepped tubular cavity of the sleeve, the piston having a tubular cavity co-axial with the stepped tubular cavity of the sleeve such that a diameter of the tubular cavity of the piston is equal to the diameter of the second portion of the stepped tubular cavity; and
   a spool located partly within the tubular cavity of the piston and the second portion of the stepped tubular cavity of the sleeve respectively, the spool bound in movement between an inner end of the piston and a plug located at an end of the sleeve adjacent the second portion of the stepped tubular cavity, the spool configured to co-operate with the inlet and outlet ports of the sleeve for reciprocally moving the piston in relation to the body so that lubricant from the lubricant inlet is delivered by the piston to the lubricant outlet via the recess.

2. The lubrication system of claim 1, wherein the recess has a first portion, a second portion distal from the first portion, and a mid-portion located between the first and second portions such that a diameter of the mid-portion is greater than a diameter of the first portion and less than a diameter of the second portion.

3. The lubrication system of claim 2, wherein the piston has a first portion in sliding engagement with the first portion of the recess, a second portion distal from the first portion and in sliding engagement with the inner surface of the sleeve adjacent the first portion of the stepped tubular cavity, and a mid-portion located between the first and second portions such that an outer diameter of the mid-portion is greater than an outer diameter of the first portion and less than an outer diameter of the second portion.

4. The lubrication system of claim 3, wherein the outer diameter of the mid-portion of the piston is less than the diameter of the first portion of the stepped tubular cavity of the sleeve to define a gap therebetween.

5. The lubrication system of claim 4 further comprising:
   a piston left chamber operatively defined between the mid-portion of the piston, an end of the mid-portion of the recess and the inner surface of the sleeve adjacent the first portion of the stepped tubular cavity of the sleeve;
   a piston right chamber operatively defined between an end of the second portion of the piston and an intermediary end of the sleeve located between and adjacent to the first and second portions of the stepped tubular cavity;
   a spool left chamber operatively defined between a left end of the spool and the inner end of the piston; and
   a spool right chamber operatively defined between a right end of the spool and the plug.

6. The lubrication system of claim 5, wherein the sleeve is configured to define:
   a first fluid crossover pathway having:
   a first port located at the end of the sleeve and disposed in fluid communication with the piston left chamber;

a second port located at the intermediary end of the sleeve and operatively disposed in fluid communication with the piston right chamber; and a third port disposed in selective fluid communication with the inlet port of the sleeve based on a position of the spool relative to the sleeve.

7. The lubrication system of claim 6, wherein the sleeve is configured to define:
a second fluid crossover pathway having:
a first annular groove defined on the inner surface adjacent the first portion of the stepped tubular cavity of the sleeve; and
a fourth port disposed in fluid communication with the first annular groove and extending from the first annular groove towards the intermediary end of the sleeve for defining a first return conduit extending towards the inner surface of the sleeve adjacent the second portion of the stepped tubular cavity of the sleeve and terminating in a fifth port disposed in selective fluid communication with the outlet port of the sleeve based on a position of the spool relative to the sleeve.

8. The lubrication system of claim 7, wherein the spool is configured to define:
a supply conduit having an inlet port located at a first point partway along a length of the spool and extending from the inlet port towards the left end of the spool to define an outlet port, the inlet port of the supply conduit disposed in selective fluid communication with the inlet port of the sleeve based on a position of the spool relative to the sleeve;
a switch conduit having a first switch port located at a second point partway along the length of the spool, the switch conduit extending from the first switch port towards the right end of the spool so as to define a second switch port operatively disposed in fluid communication with the spool right chamber; and
a second return conduit configured to selectively communicate fluid from the switch conduit to the outlet port of the sleeve via the supply conduit based on a positioning of the spool relative to a second annular groove defined on an inner surface of the mid-portion of the piston.

9. The lubrication system of claim 6, wherein the inner surface of the sleeve, located between the third port of the sleeve and the plug, is configured to define a first locking groove and a second locking groove respectively, the second locking groove disposed in a spaced apart manner from the first locking groove.

10. The lubrication system of claim 9, wherein the spool has a spring-biased detent mechanism configured to co-operate independently with each of the first and second locking grooves for offering a pre-determined amount of bias against movement of the spool relative to the sleeve and the piston.

11. A hydraulic hammer comprising:
a housing;
a tool extending outwardly from the housing and supported by a power cell disposed within the housing;
a valve body disposed within the housing and associated with the power cell; and
a lubrication system having:
a body associated with the valve body and defining a recess in fluid communication with a lubricant inlet and a lubricant outlet;
a sleeve located co-axially within the recess, the sleeve having:

an outer surface and an inner surface defining a stepped tubular cavity having a first portion and a second portion, wherein the first portion has a diameter greater than a diameter of the second portion, and
an inlet port and an outlet port extending from the outer surface to the inner surface adjacent to the second portion of the stepped tubular cavity;
a piston located partly within the recess and the first portion of the stepped tubular cavity of the sleeve respectively such that the piston is in sliding engagement with the inner surface adjacent the first portion of stepped tubular cavity of the sleeve, the piston having a tubular cavity co-axial with the stepped tubular cavity of the sleeve such that a diameter of the tubular cavity of the piston is equal to the diameter of the second portion of the stepped tubular cavity; and
a spool located partly within the tubular cavity of the piston and the second portion of the stepped tubular cavity of the sleeve respectively, the spool bound in movement between an inner end of the piston and a plug located at an end of the sleeve adjacent the second portion of the stepped tubular cavity, the spool configured to co-operate with the inlet and outlet ports of the sleeve for reciprocally moving the piston in relation to the body so that lubricant from the lubricant inlet is delivered by the piston to the lubricant outlet via the recess.

12. The hydraulic hammer of claim 11, wherein the recess has a first portion, a second portion distal from the first portion, and a mid-portion located between the first and second portions such that a diameter of the mid-portion is greater than a diameter of the first portion and less than a diameter of the second portion.

13. The hydraulic hammer of claim 12, wherein the piston has a first portion in sliding engagement with the first portion of the recess, a second portion distal from the first portion and in sliding engagement with the inner surface adjacent the first portion of the stepped tubular cavity of the sleeve, and a mid-portion located between the first and second portions such that an outer diameter of the mid-portion is greater than an outer diameter of the first portion and less than an outer diameter of the second portion.

14. The hydraulic hammer of claim 13, wherein the outer diameter of the mid-portion of the piston is less than the diameter of the first portion of the stepped tubular cavity of the sleeve to define a gap therebetween.

15. The hydraulic hammer of claim 14 further comprising:
a piston left chamber operatively defined between the mid-portion of the piston, an end of the mid-portion of the recess and the inner surface of the sleeve adjacent the first portion of the stepped tubular cavity of the sleeve;
a piston right chamber operatively defined between an end of the second portion of the piston and an intermediary end of the sleeve located between and adjacent to the first and second portions of the stepped tubular cavity;
a spool left chamber operatively defined between a left end of the spool and the inner end of the piston; and
a spool right chamber operatively defined between a right end of the spool and the plug.

16. The hydraulic hammer of claim 15, wherein the sleeve is configured to define:
a first fluid crossover pathway having:
a first port located at the end of the sleeve and disposed in fluid communication with the piston left chamber;

a second port located at the intermediary end of the sleeve and operatively disposed in fluid communication with the piston right chamber; and a third port disposed in selective fluid communication with the inlet port of the sleeve based on a position of the spool relative to the sleeve.

17. The hydraulic hammer of claim 16, wherein the sleeve is configured to define:

a second fluid crossover pathway having:

a first annular groove defined on the inner surface adjacent the first portion of the stepped tubular cavity of the sleeve; and a fourth port disposed in fluid communication with the first annular groove and extending from the first annular groove past the intermediary end of the sleeve for defining a first return conduit extending towards the inner surface of the sleeve adjacent the second portion of the stepped tubular cavity of the sleeve and terminating in a fifth port disposed in selective fluid communication with the outlet port of the sleeve based on a position of the spool relative to the sleeve.

18. The hydraulic hammer of claim 17, wherein the spool is configured to define:

a supply conduit having an inlet port located at a first point partway along a length of the spool and extending from the inlet port towards the left end of the spool to define an outlet port, the inlet port of the supply conduit disposed in selective fluid communication with the inlet port of the sleeve based on a position of the spool relative to the sleeve;

a switch conduit having a first switch port located at a second point partway along the length of the spool, the switch conduit extending from the first switch port towards the right end of the spool so as to define a second switch port operatively disposed in fluid communication with the spool right chamber; and a second return conduit configured to selectively communicate fluid from the switch conduit to the outlet port of the sleeve via the supply conduit based on a positioning of the spool relative to a second annular groove defined on an inner surface of the mid-portion of the piston.

19. The hydraulic hammer of claim 16, wherein the inner surface of the sleeve, located between the third port of the sleeve and the plug, is configured to define a first locking groove and a second locking groove respectively, the second locking groove disposed in a spaced apart manner from the first locking groove.

20. The hydraulic hammer of claim 19, wherein the spool has a spring-biased detent mechanism configured to co-operate independently with each of the first and second locking grooves to offer a pre-determined amount of bias against movement of the spool relative to the sleeve and the piston.

* * * * *